(12) United States Patent
Miramonti

(10) Patent No.: US 7,911,816 B2
(45) Date of Patent: Mar. 22, 2011

(54) LINEAR, INDUCTANCE BASED CONTROL OF REGULATED ELECTRICAL PROPERTIES IN A SWITCH MODE POWER SUPPLY OF A THERMAL PROCESSING SYSTEM

(75) Inventor: John Miramonti, West Lebanon, NH (US)

(73) Assignee: Hypertherm, Inc., Hanover, NH (US)

( * ) Notice: Subject to any disclaimer, the term of this patent is extended or adjusted under 35 U.S.C. 154(b) by 1138 days.

(21) Appl. No.: 11/602,046

(22) Filed: Nov. 20, 2006

(65) Prior Publication Data

US 2008/0084721 A1 Apr. 10, 2008

Related U.S. Application Data

(60) Provisional application No. 60/825,544, filed on Sep. 13, 2006.

(51) Int. Cl.
*H02M 3/335* (2006.01)
(52) U.S. Cl. .............................. 363/97; 700/31; 219/663
(58) Field of Classification Search .................. 363/89, 363/97; 323/283; 219/663–664; 700/29, 700/31, 44–45
See application file for complete search history.

(56) References Cited

U.S. PATENT DOCUMENTS

| | | | | |
|---|---|---|---|---|
| 2,995,302 A | 8/1961 | Ingwerson et al. | ............ | 235/152 |
| 3,109,092 A | 10/1963 | Lott et al. | ....................... | 235/164 |
| 3,569,684 A | 3/1971 | Burnett | ......................... | 235/152 |
| 3,633,017 A | 1/1972 | Crooke | ......................... | 235/156 |
| 3,649,821 A | 3/1972 | Gumacos | ....................... | 235/152 |
| 3,679,881 A | 7/1972 | Gondeck | ....................... | 235/152 |
| 4,159,526 A | 6/1979 | Mosley, Jr. et al. | ........... | 364/721 |
| 4,172,286 A | 10/1979 | Wess | .............................. | 264/721 |
| 4,285,044 A | 8/1981 | Thomas et al. | ................ | 364/721 |
| 4,486,846 A | 12/1984 | McCallister et al. | ......... | 364/607 |
| 5,086,205 A | 2/1992 | Thommes | ............... | 219/121.54 |
| 5,410,573 A | 4/1995 | Taga et al. | ..................... | 375/376 |
| 5,517,535 A | 5/1996 | Kroeger et al. | ............... | 375/373 |
| 5,619,154 A | 4/1997 | Strolle et al. | .................. | 327/129 |
| 5,620,617 A | 4/1997 | Borowy et al. | .......... | 219/121.54 |
| 5,714,911 A | 2/1998 | Gilbert | ........................... | 331/57 |
| 5,866,872 A | 2/1999 | Lu et al. | .................. | 219/121.56 |
| 6,188,044 B1 * | 2/2001 | Lee et al. | ...................... | 219/390 |

(Continued)

OTHER PUBLICATIONS

Basso, C., "Keep your Switch Mode Supply stable with a Critical-Mode Controller," Motorola Semiconductors, Nov. 1997 (pp. 1-9).

(Continued)

*Primary Examiner* — Harry Behm
(74) *Attorney, Agent, or Firm* — Proskauer Rose LLP

(57) ABSTRACT

A method and apparatus is featured for providing linear control of a regulated electrical property (e.g., current or voltage) in a switch mode power supply of a thermal processing system that includes an inductive element and at least one switching element. The method and apparatus feature structure, or steps, for generating a nonlinear model that predict values for a regulated electrical property of the inductive element based on a given duty cycle of the at least one switching element and structure, or steps, for generating a nonlinear model that determines a duty cycle for the at least one switching element based on the nonlinear predictive model for the regulated electrical property, the nonlinear model determining the duty cycle such that a linear relationship results between the regulated electrical property and a selected value. A method and apparatus is also featured for providing cross regulation between pre-regulator and post-regulator power stages of a switch mode power supply of a thermal processing system.

22 Claims, 11 Drawing Sheets

U.S. PATENT DOCUMENTS

| | | | | |
|---|---|---|---|---|
| 6,359,258 | B1 | 3/2002 | Blankenship et al. ... | 219/130.01 |
| 6,365,868 | B1 | 4/2002 | Borowy et al. ......... | 219/121.54 |
| 6,642,796 | B2 | 11/2003 | Royle ........................ | 331/1 A |
| 7,545,130 | B2* | 6/2009 | Latham ...................... | 323/283 |
| 2005/0168198 | A1* | 8/2005 | Maksimovic et al. ...... | 323/222 |

OTHER PUBLICATIONS

Chen, J., "Predictive Digital Current Programmed Control," IEEE Transactions on Power Electronics, vol. 18, No. 1, Jan. 2003, (pp. 411-419).

Choudhury, S., "Average Current Mode Controlled Power Factor Correction Converter Using TMS320LF2407A," Texas Instruments Application Report, SPRA902, Digital Power Group, Digital Control Systems, Apr. 2003 (pp. 1-15).

Dixon, L., "Average Current Mode Control of Switching Power Supplies," Unitrode Corporation, date unknown (pp. 3-356-3-369).

Dixon, L., "Control Loop Cookbook," date unknown (40 pages).

Dranga, O., "Bifurcation Behavior of a Power-Factor-Correction Boost Converter," International Journal of Bifurcation and Chaos, vol. 13, No. 10 (2003) (pp. 3107-3114).

Erickson, B., "Advancing Digital Control of Switched-Mode Converters," Colorado Power Electronics Center, date unknown (27 pages).

Kawabata, T., "Dead Beat Control of Three Phase PWM Inverter," IEEE Transactions on Power Electronics, vol. 5, No. 1, Jan. 1990 (pp. 21-28).

Kawamura, A., "Deadbeat Controlled PWM Inverter with Parameter Estimation Using Only Voltage Sensor," IEEE Transactions on Power Electronics, vol. 3, No. 2, Apr. 1988 (pp. 118-125).

Malesani, L., "Robust Dead-Beat Current Control for PWM Rectifiers and Active Filters," IEEE Transactions on Industry Applications, vol. 35, No. 3, May/Jun. 1999 (pp. 613-620).

Mattavelli, P., "Predictive Digital Control of Power Factor Preregulators With Input Voltage Estimation Using Disturbance Observers," IEEE Transactions on Power Electronics, vol. 20, No. 1, Jan. 2005 (pp. 140-147).

Mitchell, D., "Designing Stable Control Loops," source unknown, date unknown (pp. 5-1-5-30).

Pavljašević, S., "Subharmonic Oscillations in Converters with Current-Mode Programming Under Large Parameter Variations," IEEE Power Electronics Specialists Conference, St. Louis, Missouri, Jun. 22-27, 1997 (pp. 1/7-7/7).

Ridley, R., "A New, Continuous-Time Model for Current-Mode Control," IEEE Transactions on Power Electronics, vol. 6, No. 2, Apr. 1991 (pp. 271-280).

Ridley, R., "Designer's Series, Part V, Current-Mode Control Modeling," Ridley Engineering, Inc., 2001 (9 pages).

Tse, C., "Tutorial Notes on Chaos in Power Electronics," IEEE ISCAS' 2003, Department of Electronic and Information Engineering, Hong Kong Polytechnic University, Hong Kong, China (28 pages).

Tse, C., "Nonlinear Phenomena in Power Electronics," Hong Kong Polytechnic University, Hong Kong, China, date unknown (46 pages).

Vorpérian, V., "Simplified Analysis of PWM Converters Using Model of PWM Switch Part I: Continuous Conduction Mode," IEEE Transactions on Aerospace and Electronic Systems, vol. 26, No. 3, May 1990 (pp. 490-496).

Vorpérian, V., "Simplified Analysis of PWM Converters Using Model of PWM Switch Part II: Discontinuous Conduction Mode," IEEE Transactions on Aerospace and Electronic Systems, vol. 26, No. 3, May 1990 (pp. 497-505).

Zhang, W., "A Digital Power Factor Correction (PFC) Control Strategy Optimized for DSP," IEEE Transactions on Power Electronics, vol. 19, No. 6, Nov. 2004 (pp. 1474-1485).

Zhou, C., "Design Trade-offs in Continuous Current-Mode Controlled Boost Power-Factor Correction Circuits," Delta Power Electronics Lab., Inc., HFPC—May 1992 Proceedings (pp. 209-219).

Unknown Author, "The Right-Half-Plane Zero—A Simplified Explanation," Source and Date unknown (pp. C2-1—C2-4).

Unknown Author, "An Accurate and Practical Small-Signal Model for Current-Mode Control," Ridley Engineering, Inc., Copyright 1999, (pp. 1-23).

Feucht, D., "The Tymerski Switch Model," http://www.innovatia.com/Design_Center/tymerski_switch_model.htm, last visited Apr. 25, 2005, 2001 (pp. 1-4).

* cited by examiner

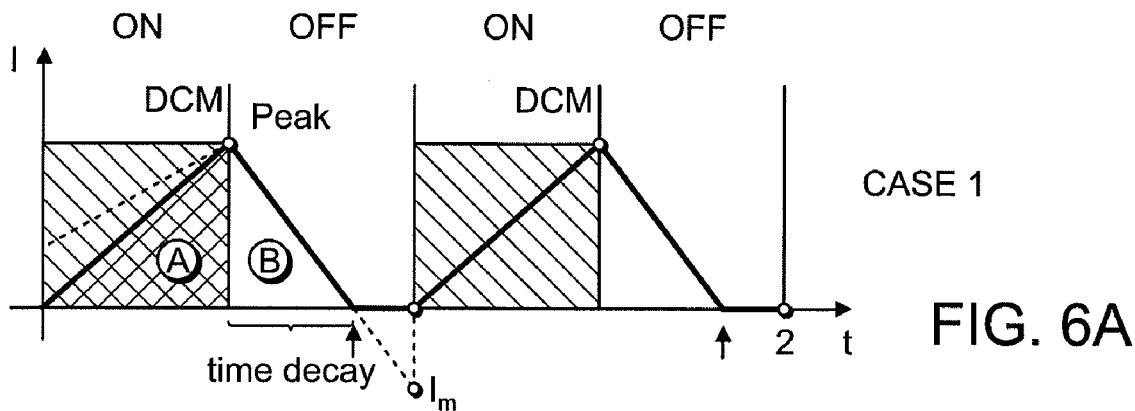
FIG. 6A CASE 1
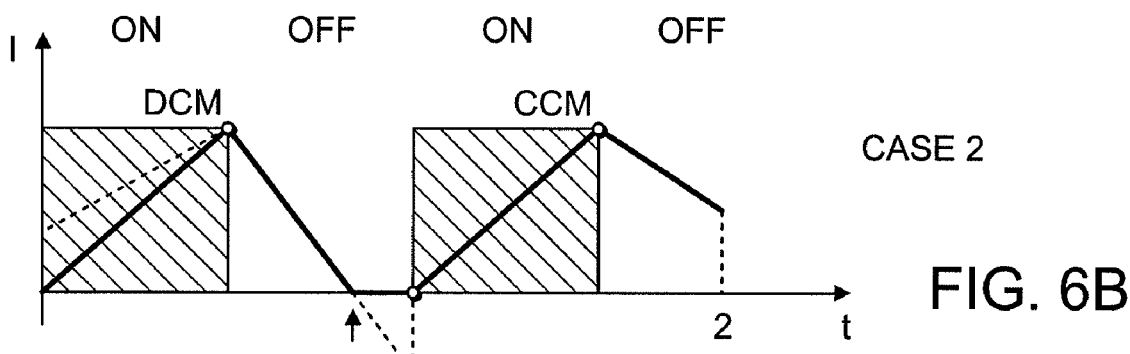
FIG. 6B CASE 2
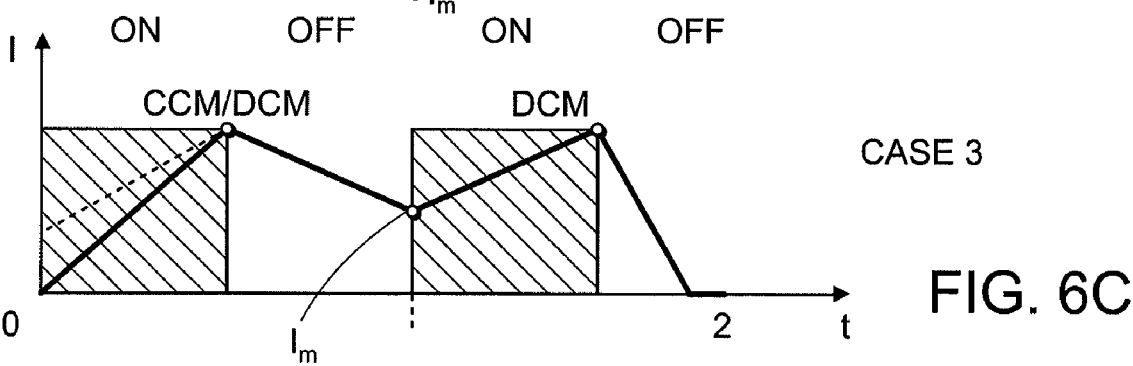
FIG. 6C CASE 3
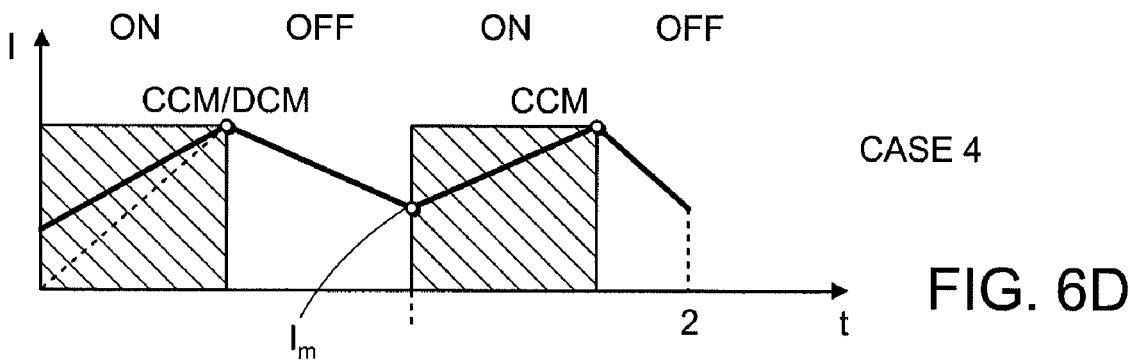
FIG. 6D CASE 4

LINEAR, INDUCTANCE BASED CONTROL OF REGULATED ELECTRICAL PROPERTIES IN A SWITCH MODE POWER SUPPLY OF A THERMAL PROCESSING SYSTEM

RELATED APPLICATION(S)

This application claims the benefit of U.S. Provisional Application No. 60/825,544, filed on Sep. 13, 2006. The entire teachings of the above application are incorporated herein by reference.

This application relates to co-pending U.S. patent application Ser. No. 11/602,047, entitled "Arc Voltage Estimation And Use Of Arc Voltage Estimation In Thermal Processing Systems," filed concurrently herewith. The entire teachings of the above application are incorporated herein by reference.

BACKGROUND

A Switch Mode Power Supply (SMPS) is a broad category of power supplies that are useful for applications requiring substantial amounts of power yet good regulation and control of the power delivered to the load. One such application includes plasma arc torches for welding and cutting of metallic workpieces. Switch mode power supplies are built around one or more switches or other switching elements.

Inductance based SMPS designs control the current flowing in an inductive element. The inductive element can take the form of an inductor, a transformer or both. The input control value of a switch is either ON or OFF. The ratio of the switch ON time to the sum of the ON time and OFF time is the duty cycle (D) of the switch.

A relationship can be developed between the duty cycle D and a regulated value, such as input or output voltage or current. This relationship is essentially linear over a finite range of operation. As long as the SMPS operates within the linear control range, classical control theory can be applied to the analysis and design of an inductance based, switch mode power supply.

SUMMARY OF THE INVENTION

In some applications, the operation of a power supply can be constrained within a linear control range because the load attached to the power supply and the current drawn by the load is relatively constant. However, in other applications, such as those involving thermal processing systems, it is very difficult to constrain operation of the power supply within a linear control range because the load and load processing varies over time. Thermal processing systems, such as laser and plasma arc systems, are widely used in the cutting, welding, heat treating, and processing of metallic materials.

One such thermal processing system includes plasma arc systems used for processing of metallic materials, including cutting, welding and the like. Plasma arc systems, both manual and mechanized systems, include at least a plasma arc torch and a power supply. The power supply provides the electrical current necessary to generate a plasma arc from the tip of the torch to the metallic workpiece. The current drawn and the operation of the power supply for initiating and maintaining the plasma arc depend on a number of factors. Such factors include the type and thickness of the metallic workpiece, the selection of consumable components of the torch (e.g., nozzle and electrode), movement of the torch over the workpiece, and whether the workpiece is being pierced, marked, cut or welded, for example. As a result, attempts to control operation of the power supply within a linear control range using known linear control techniques is often not possible.

For example, with respect to inductance based SMPS topologies, the current in an inductive element changes at a rate proportional to the voltage across it. If the switching frequency and duty cycle are appropriate, the inductive current may not return to zero at any point during the switching period. In this case, the SMPS is operating in Continuous Current Mode (CCM). If the current does return to zero during the switching period, the SMPS is operating in Discontinuous Current Mode (DCM). FIGS. 1A and 1B are signal diagrams that illustrate inductive current over time in steady state CCM and DCM modes, respectively.

The transfer function, or "linear approximation," of a circuit operating in DCM is significantly different from a circuit operating in CCM. The difference in these transfer functions generally leads to a restriction in the design of the SMPS to operation in either DCM or CCM mode, but not both, in order to maintain stability. Such restriction can lead to limitations in terms of minimum and maximum load and also limitations on the design of the element(s) of the SMPS.

Even if constrained to operate in CCM or DCM mode, many SMPS topologies designed and compensated using classic linear control theory exhibit instability and even chaotic behavior under certain operating conditions. These difficulties stem primarily from switch operation at a point where the assumption of linearity is invalid. Such instability includes subharmonic oscillation, chaotic instability, chaotic bifurcation, and the like. Even if further constrained to operate within the linear control range, the "linear" relationship between the duty cycle and the current in an inductor is not actually linear and changes depending on the operating point of the SMPS.

It is desirable to have a control method for a switch mode power supply that is in fact linear, such that a selected voltage or current can be achieved regardless of variations in electrical inputs and outputs of the switch mode power supply or operation in DCM, CCM and transitions therebetween. As a result, removal of load restrictions and more economical and efficient SMPS designs can be facilitated.

According to one aspect, a method and apparatus is featured for providing linear control of a regulated electrical property (e.g., current or voltage) in a switch mode power supply of a thermal processing system that includes an inductive element and at least one switch. The method and apparatus feature steps of, or structure for, generating a nonlinear model that predict values for a regulated electrical property of the inductive element in the switch mode power supply of the thermal processing system based on a given duty cycle of the at least one switch and structure, or steps, for generating a nonlinear model that determines a duty cycle for the at least one switch based on the nonlinear predictive model for the regulated electrical property, the nonlinear model determining the duty cycle such that a linear relationship results between the regulated electrical property and a selected value.

The method and apparatus can also feature further steps of, or structure for, determining the duty cycle to achieve the selected value for the regulated electrical property from the nonlinear model for determining the duty cycle. The nonlinear model for determining the duty cycle of the at least one switch can determine the duty cycle such that a linear relationship results between the regulated electrical property and the selected value regardless of variations in electrical inputs and outputs of the switch mode power supply. The regulated electrical property of the inductive element can be input or output, average, peak or trough current, voltage or power. The switch mode power supply can include inductance based, boost converters, buck converter, buck-boost converter and boost-buck converter topologies and variations thereof, including Cuk, SEPIC, Zeta and the like.

According to a particular embodiment, the method and apparatus for providing linear control of a regulated electrical property features the steps of, or structure for, generating a nonlinear, predictive model for predicting discrete values of inductive current in a circuit mode based on present values of duty cycle, applied voltage and inductive current; generating a nonlinear, predictive model for predicting average values of inductive current in the circuit mode based on the present and predicted values for inductive current; and generating a nonlinear, predictive model for determining a duty cycle from the models for predicting the discrete and average values of inductive current that results in a linear relationship between an average value for inductive current and a selected value in the circuit mode. The circuit mode can include Continuous Current Mode (CCM) or Discontinuous Current Mode (DCM).

According to another particular embodiment, the method and apparatus for providing linear control of a regulated electrical property features the steps of, or structure for, generating, based on present values of duty cycle, applied voltage and inductive current, a plurality of nonlinear models for predicting discrete values of inductive current in each circuit mode or transition between circuit modes; generating, based on the present and predicted values for inductive current, a plurality of nonlinear models for predicting average values of inductive current in each circuit mode or transition between circuit modes; and generating, based on the models for predicting the discrete and average values of inductive current, a plurality of nonlinear, predictive models for determining a duty cycle that results in a linear relationship between an average value for inductive current and a selected value in each circuit mode or transition between circuit modes. The method and apparatus for providing linear control of a regulated electrical property can feature further steps of, or structure for, determining a circuit mode or transition being entered during a subsequent switching period; selecting one of the plurality of nonlinear models for determining the duty cycle that corresponds to the determined circuit mode or transition; and determining the duty cycle for the selected value from the selected model. The circuit mode can include Continuous Current Mode (CCM) or Discontinuous Current Mode (DCM). The transition between circuit modes can include CCM to DCM or DCM to CCM.

According to another aspect of the invention, a method and apparatus is featured for cross-regulation between a pre-regulation power stage and a post-regulation power stage of a power supply of a thermal processing system. The method and apparatus feature steps of, or structure for, modeling output power from a post-regulator power stage of a power supply of a thermal processing system; modeling input power to the post-regulator power stage of the power supply; determining a current required from a pre-regulator power stage to at least substantially maintain the output power based on the modeled input and output power; and generating the required current from the pre-regulator power stage of the power supply.

According to a particular embodiment, the required current from the pre-regulator power stage can be generated by providing the required current as an input to a processing module that implements a method for providing linear control of a inductive current in the pre-regulator power stage that comprises an inductive element and at least one switching element. The method and apparatus can feature further steps of, or structure for, generating a nonlinear model for predicting values for inductive current based on a given duty cycle of the at least one switching element; and generating a nonlinear model for determining a duty cycle for the at least one switching element based on the nonlinear predictive model for the inductive current, the nonlinear model determining the duty cycle such that a linear relationship results between the regulated electrical property and the required current value.

BRIEF DESCRIPTION OF DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 6A-6D are signal diagrams of current mode transitions for illustrating a particular method for selection of the appropriate model.

DETAILED DESCRIPTION

According to one aspect, a method and apparatus is featured for providing linear control of a regulated electrical property (e.g., current or voltage) in a switch mode power supply of a thermal processing system that includes an inductive element and at least one switch. The method and apparatus feature structure, or steps, for generating a nonlinear model that predict values for a regulated electrical property of the inductive element in the switch mode power supply of a thermal processing system based on a given duty cycle of the at least one switch and structure, or steps, for generating a nonlinear model that determines a duty cycle for the at least one switch based on the nonlinear predictive model for the regulated electrical property, the nonlinear model determining the duty cycle such that a linear relationship results between the regulated electrical property and a selected value.

The method and apparatus can also include further structure, or steps, for determining the duty cycle to achieve the selected value for the regulated electrical property from the nonlinear model for determining the duty cycle. The nonlinear model for determining the duty cycle of the at least one switch can determine the duty cycle such that a linear relationship results between the regulated electrical property and the selected value regardless of variations in electrical inputs and outputs of the switch mode power supply. The regulated electrical property of the inductive element can be current or voltage. The switch mode power supply can include inductance based, boost converters, buck converter, buck-boost converter and boost-buck converter topologies and variations thereof, including Cuk, SEPIC, Zeta and the like.

Advantages of particular embodiments can include one of more of the following, namely minimizing overshoot and undershoot regardless of load or duty cycle, removal of load restrictions, and development of more economical, efficient and easier to implement SMPS designs; development of Power Factor Correction (PFC) stages that provide optimal performance in the presence of a light load or when switching between DCM and CCM modes of operation; dynamic measurement of the inductance values which are known to vary depending on the current through the inductor, the temperature, the core material, the design and other factors; detection of saturation, and/or near saturation; and cross regulation between interconnected power stages, for instance, cross regulation of a Boost Pre-regulator supplying a Buck derived Post-regulator or a multiple output SMPS.

Although not so limited, the following embodiments describe applications related to the measurement and control of current in an inductive element, without any loss of applicability to voltage or current.

Figure 1A:
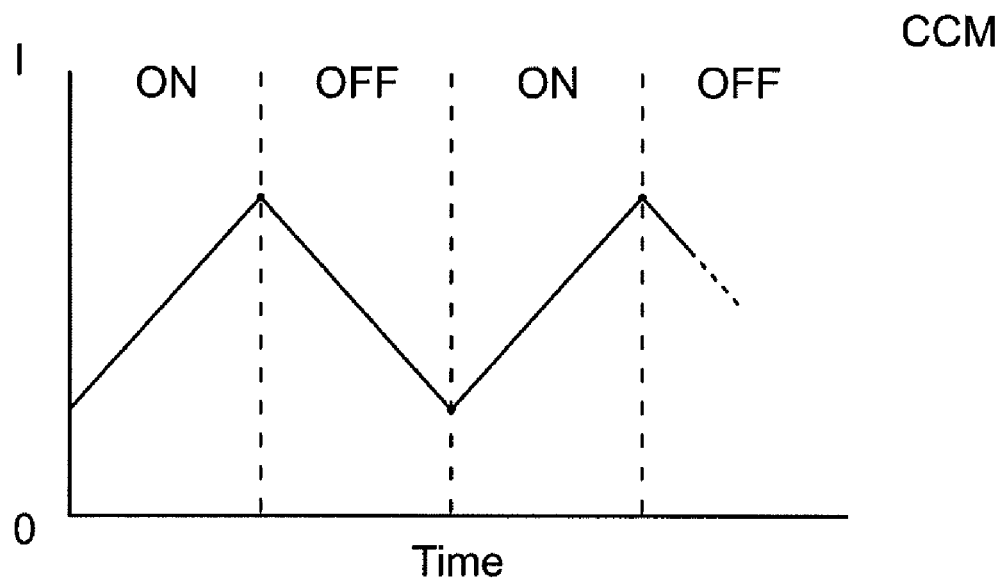
FIGS. 1A and 1B are signal diagrams that illustrate inductive current over time in steady state CCM and DCM modes, respectively.
Figure 1B:
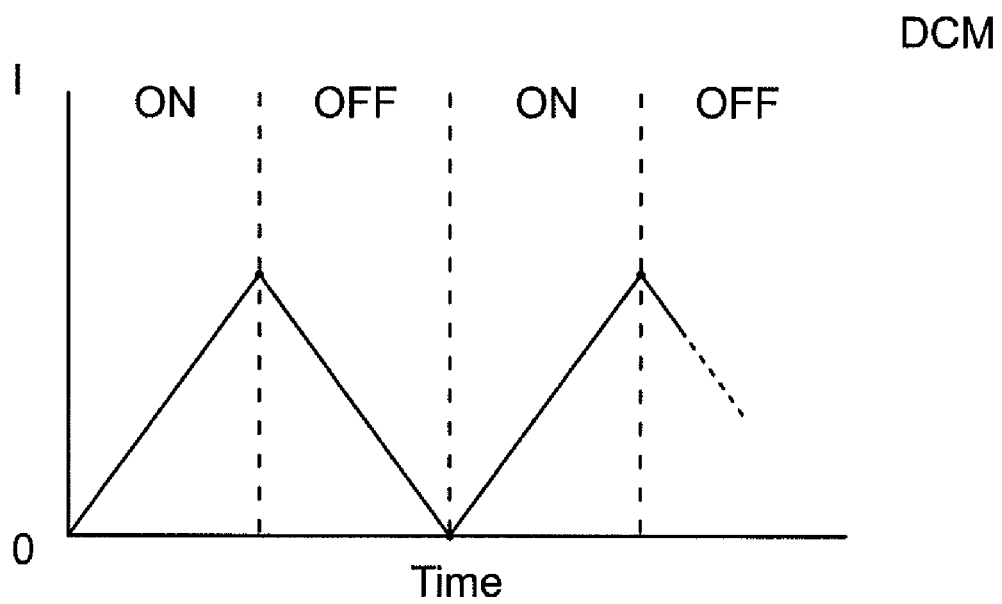
Figure 2:
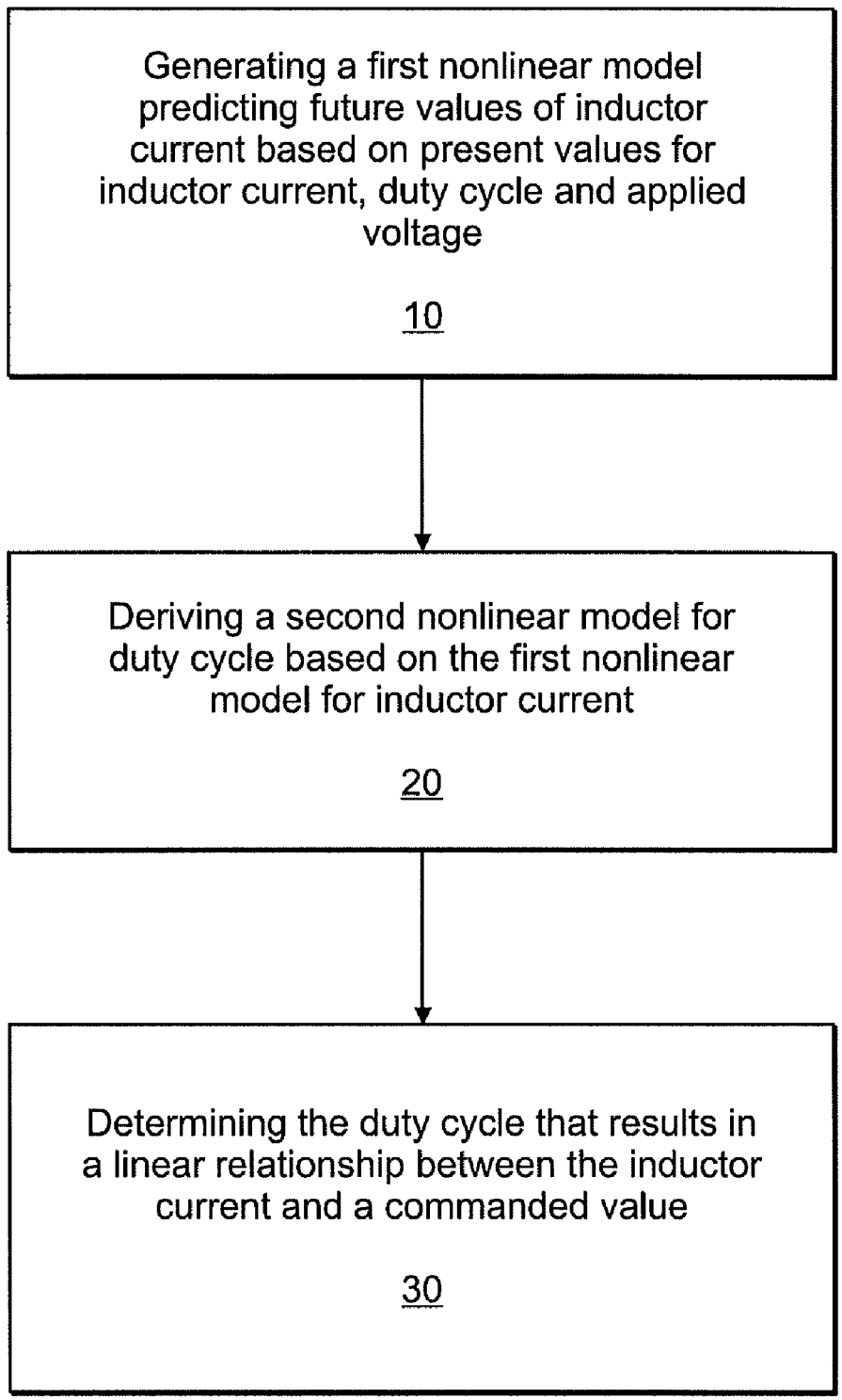
FIG. 2 is a flow diagram that illustrates a linear, inductance based control method that regulates the current flowing through a switch mode power supply comprising an inductive element and a switch.

FIG. 2 is a flow diagram that illustrates a linear, inductance based control method that regulates the current flowing through a switch mode power supply comprising an inductive element and a switch. The method is based on the principle that the rate of change of current in an inductive element varies linearly in proportion to the voltage across it. This implies that the rate of change of the inductive current can be linearly controlled by controlling the voltage applied across the inductive element. By using a switching period having a duration T that is short enough so that the voltage applied across the inductive element is relatively constant and the rate of change of the inductive current is approximately linear, the effective applied voltage can be linearly controlled by varying the duty cycle D.

At step 10, a nonlinear model is generated for predicting future values of the current through an inductive element of the switch mode power supply based on present values of the duty cycle, inductive current, and applied voltage. For example, in most SMPS topologies, the applied voltage $V_{applied}$ depends on both the input voltage $V_{in}$ and the output voltage $V_o$ of the switch mode power supply. Both of these values are typically known or capable of being measured or estimated. For example, a system and method for estimating output voltage is disclosed in co-pending U.S. patent application Ser. No. 11/602,047, entitled "Arc Voltage Estimation And Use Of Arc Voltage Estimation In Thermal Processing Systems," filed concurrently herewith. The entire teachings of the above application are incorporated herein by reference. If the applied voltage $V_{applied}$, the duty cycle D and the inductive current $I_{left}$ at the beginning of a switching period are known, then the inductive current at the end of switching period $I_{right}$ can be calculated. In particular embodiments, the nonlinear model can also be generated based on present and past values of the duty cycle, inductive current, and applied voltage.

At step 20, a nonlinear model is derived for duty cycle based on the nonlinear model for inductive current. At step 30, the duty cycle is determined for a commanded value that results in a linear relationship between the inductive current and the commanded value. For example, the control strategy involves solving the desired value for the duty cycle D that yields a desired current at the end of the switching period (or at any other time during the switching period). As a result, linearity is maintained and unstable, non-linear, and/or chaotic behavior is precluded. This method can be applied to inductance based SMPS topologies that include inductors and/or transformers, for example.

The nonlinear model between inductive current and duty cycle can be generalized for sampling of the current at times other than the beginning of the switching period. This model can also be generalized for other styles of PWM switching, such as centered operation or switching periods with more than one ON and/or OFF time. This model can also be extended to cover situations where the applied voltage is not relatively constant during the switching period at the cost of additional computational complexity.

Figure 3:
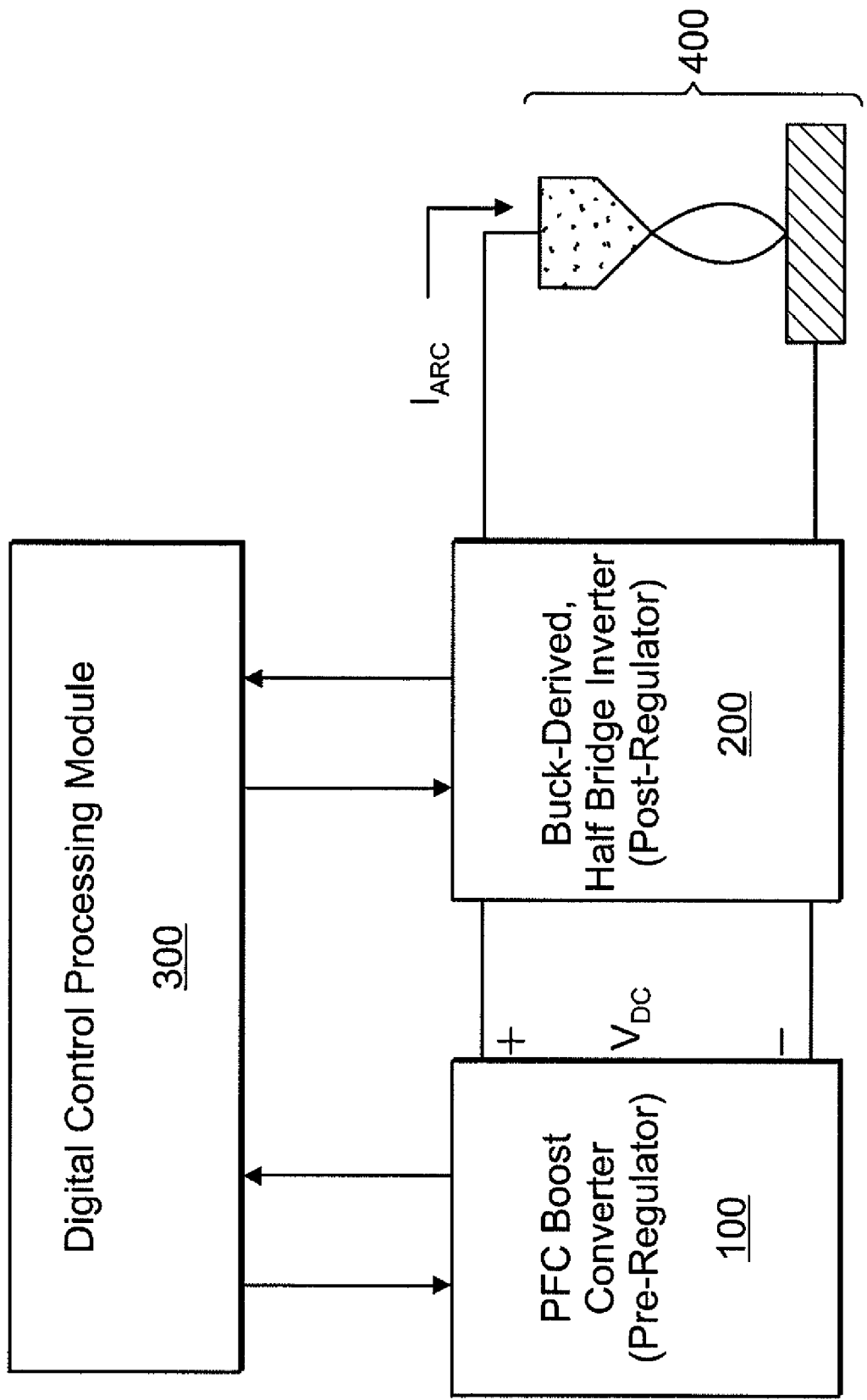
FIG. 3 is a schematic diagram of a switch mode power supply for a plasma arc torch to which embodiments of the linear, inductance based control method can be applied.

FIG. 3 is a schematic diagram of a switch mode power supply for a plasma arc torch to which embodiments of the linear, inductance based control method can be applied. In this example, the switch mode power supply includes a PFC Boost Converter (Pre-regulator) 100, a Buck-Derived, Half Bridge Inverter (Post-regulator) 200, and a digital control module 300. As shown, the boost stage 100 powers the inverter stage 200 with a constant DC voltage bus VDC. The inverter stage 200, in turn, provides an isolated current source that drives an arc current $I_{arc}$ to a plasma arc load 400.

The plasma torch power supply essentially operates in two conditions, either idling with a near zero current draw or at full load with a current draw of potentially hundreds of amperes. For example, in a particular plasma arc cutting application, the inverter can have a current draw of less than 0.25 A while idling and a draw of more than 200 A at full load. Prior art systems have had significant difficulty in maintaining stable operation over such wide current ranges, if at all. Furthermore, when the inverter is rapidly brought to full load or when the load "dumps" (e.g., the arc extinguishes and the load current almost instantly drops to zero), large voltage disturbances can be created at the output of the pre-regulator that can easily lead to over voltage situations causing damage or shutdown and requiring more expensive components and designs in order to handle these situations.

The digital control module 300 implementing one or more embodiments of the linear, inductance based control method can regulate the current through the boost and inverter stages, enabling stable operation over such wide current ranges and quick response to large step loads with minimal output disturbance. The digital control module 300 can be a digital signal processor, such as the TI TMS320LF2801 DSP from Texas Instruments. This embodiment can also deal with "pipeline" delay, which may or may not be present in the input, output or both. Alternatively, the linear, inductance based control method can be implemented using conventional computer hardware and software, devices such as microcontrollers, microprocessors, hybrid microcontrollers that incorporate features of DSPs, microcontroller and/or microprocessors, Application Specific Integrated Circuits (ASIC), gate arrays, Electrically Programmable Logic Devices (EPLD), Complex Programmable Logic Device (CPLD), Programmable Array Logic (PAL), analog hardware, or hybrid analog/digital hardware and the like.

Figure 4:
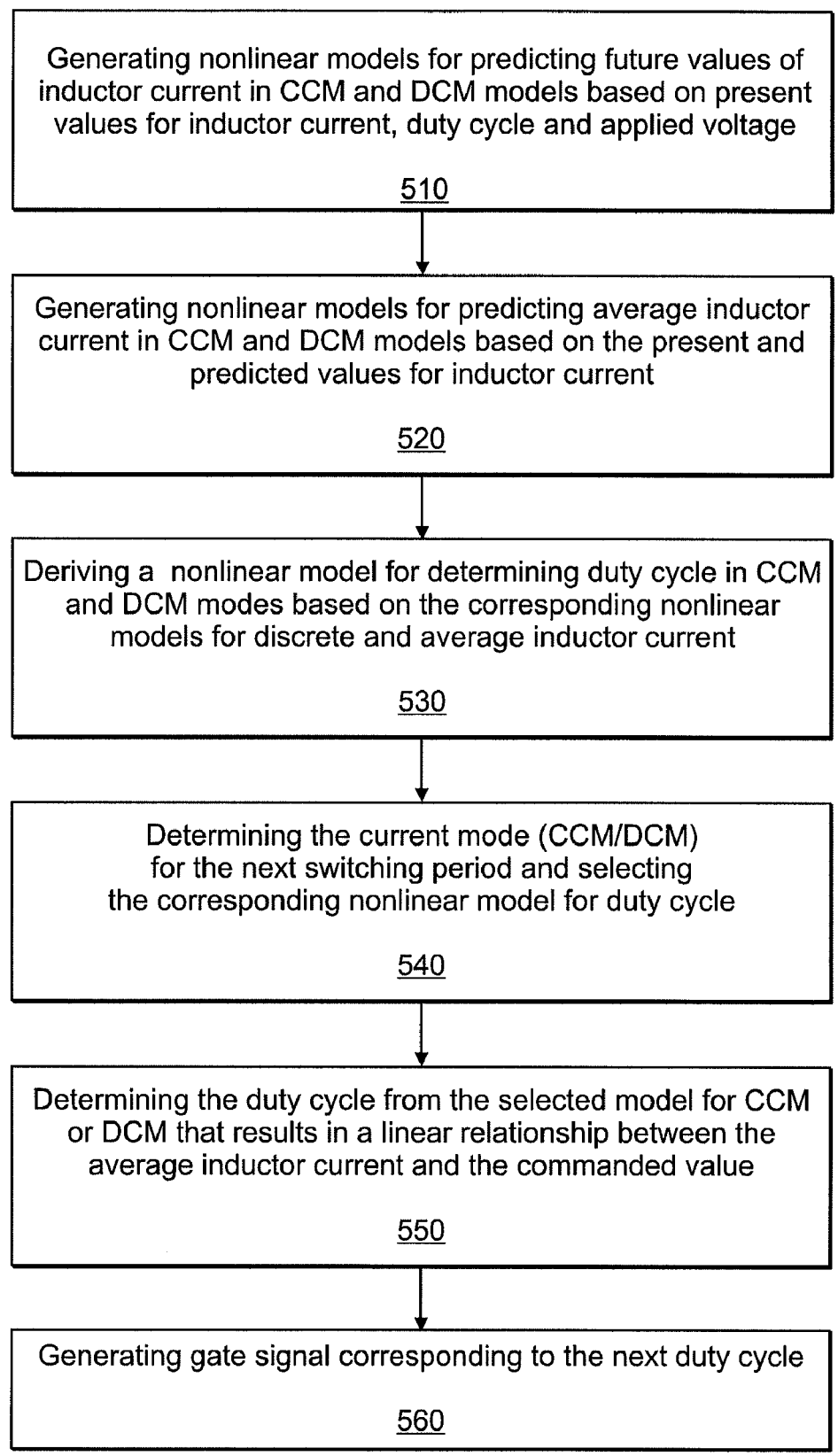
FIG. 4 is a flow diagram of an embodiment of the linear, inductance based control method for regulating average current in the respective Boost and Inverter stages.

FIG. 4 is a flow diagram of an embodiment of the linear, inductance based control method for regulating average current in the respective Boost and Inverter stages. At step 510, nonlinear models are generated for predicting discrete future value of inductive current in CCM, DCM and transitions therebetween based on a present values for inductive current, duty cycle and applied voltage.

At step 520, nonlinear models are generated for predicting the average inductive current in CCM, DCM and transitions therebetween based on the present and predicted values for inductive current. At step 530, the discrete and average models generated from steps 510 and 520, respectively, are solved in a recurrence form in order to derive a nonlinear model for determining duty cycle in each of the current modes and transitions therebetween.

At step 540, the circuit mode or transition is determined for the next switching period and the corresponding nonlinear model for duty cycle is selected accordingly. For example, if CCM is determined for the next switching period, the nonlinear model for the duty cycle in CCM is selected.

At step 550, a duty cycle for the next switching period is determined from the selected model for achieving an average inductive current having a linear relationship with respect to a commanded value, including making the average inductive current equal to a commanded value. In other embodiments, the duty cycle can be modeled to achieve a peak current, a trough current, and a ripple current, for example. At step 560, a gate signal corresponding to the next duty cycle determined at step 550 is applied to the switch(es), thereby driving the average inductive current to the commanded value during the next switching cycle. In prior art control systems, it takes a significantly greater number of switching cycles before the commanded value is obtained.

Figure 5A:
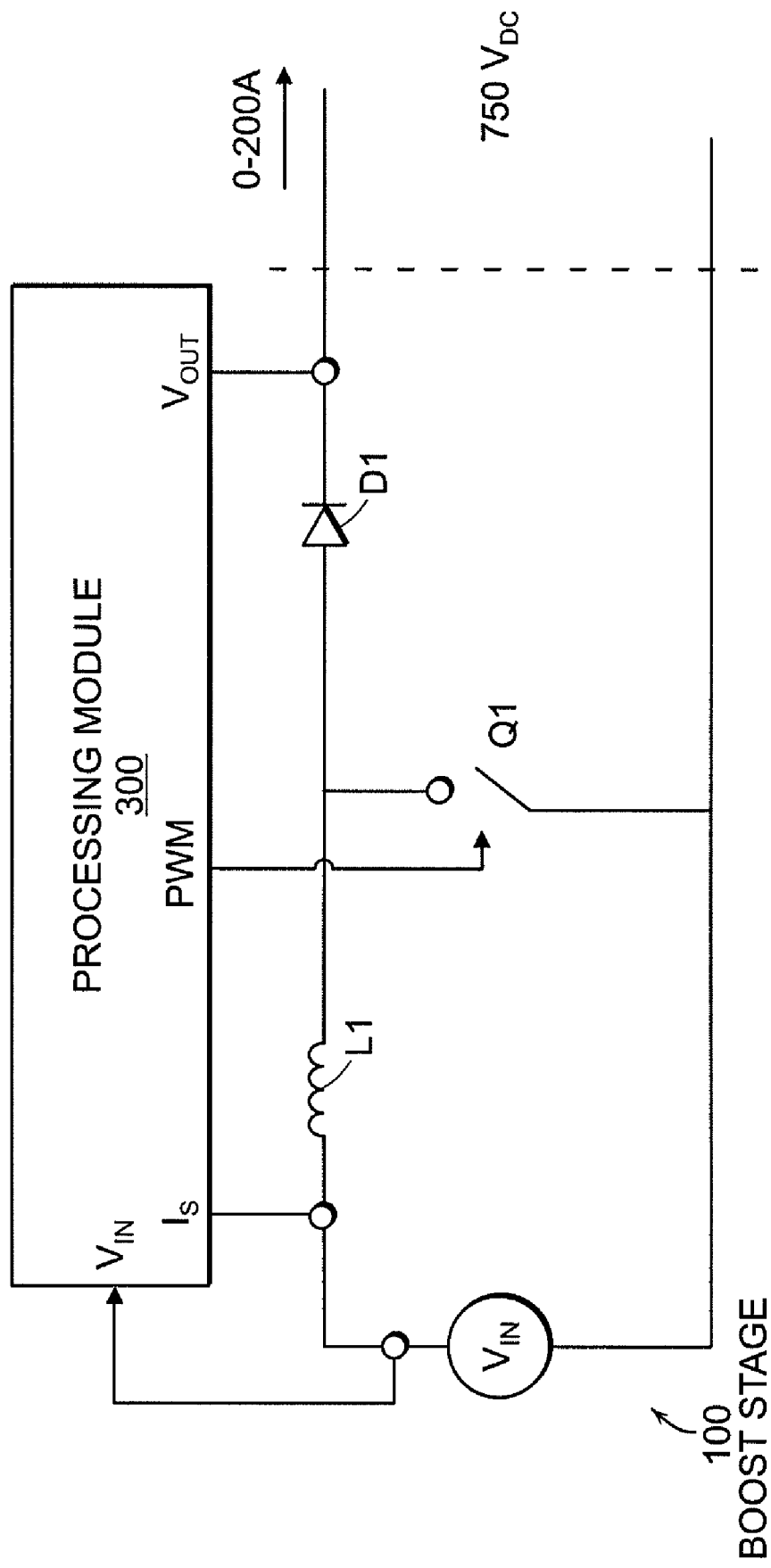
FIG. 5A is a schematic diagram of a PFC Boost Pre-regulator of a plasma torch power supply for illustrating a particular embodiment of the linear, inductance based control method.

Linear, Inductance Based Control for Regulating Average Current in a PFC Boost Pre-regulator FIG. 5A is a schematic diagram of a PFC Boost Pre-regulator of a plasma torch power supply for illustrating a particular embodiment of the linear, inductance based control method. As shown, the boost stage 100 includes an input voltage $V_{in}$, a boost inductor L1, a switch Q1 (e.g., IGBT), and a boost diode D1. In a particular plasma arc cutting application, the Boost stage 100 can receive an input voltage $V_{in}$ in the form of a full-wave rectified, pulsating DC voltage derived from a 170-660 VAC 3 phase input and deliver between 0-200 A of current to a regulated 750 VDC bus voltage $V_o$ for powering an inverter stage.

During operation, the digital control module 300 samples various points of the circuit at various sample rates, for instance, 28 KHz to 42 KHz. For example, the digital control module 300 samples and measures the input voltage $V_{in}$, output voltage $V_{out}$ and the current $I_s$ flowing in the boost inductor L1. Signal conditioning circuitry can be included to scale the samples to values suitable for processing by the processing module 300. Based on this information, the digital control module 300 can determine an appropriate duty cycle to achieve a commanded current within the next switching period as discussed in more detail below.

Table 1 identifies a number of parameters discussed in this particular embodiment of the linear, inductance based control method for controlling the average input current in the Boost Pre-regulator of FIG. 5. One skilled in the art can readily appreciate that other implementations are possible.

TABLE 1

| | |
|---|---|
| $I_{sample}$ or $I_s$ | Present value of current sample |
| $I_{left}$ or $I_l$ | Current at the beginning of the switching period. |
| $I_{right}$ or $I_r$ | Current at the end of the switching period. |
| $I_{bottom}$ or $I_b$ | Lowest value of current during the switching period. |
| $I_{top}$ or $I_t$ | Highest value of current during the Switching period. |
| $I_{min}$ or $I_m$ | Lowest value of current during the Switching period. |
| $I_{peak}$ or $I_p$ | Highest value of current during the Switching period. |
| $z^{-1}$ | Time delay operator. |
| $I_s * z^0$ or $I_s$ | Present value of current sample |
| $I_s * z^1$ | Current sample delayed one switching period. |
| $I_s * z^{-1}$ | Current sample preceding the present current sample |
| D | Duty cycle of the current switching period |
| L | Inductance in Henries. |
| T | Switching period in seconds. |
| $V_{in}$ or $V_i$ | Input voltage. |
| $V_{out}$ or $V_o$ | Output voltage. |

Modeling Duty Cycle in Continuous Current Mode (CCM)

Figure 5B:
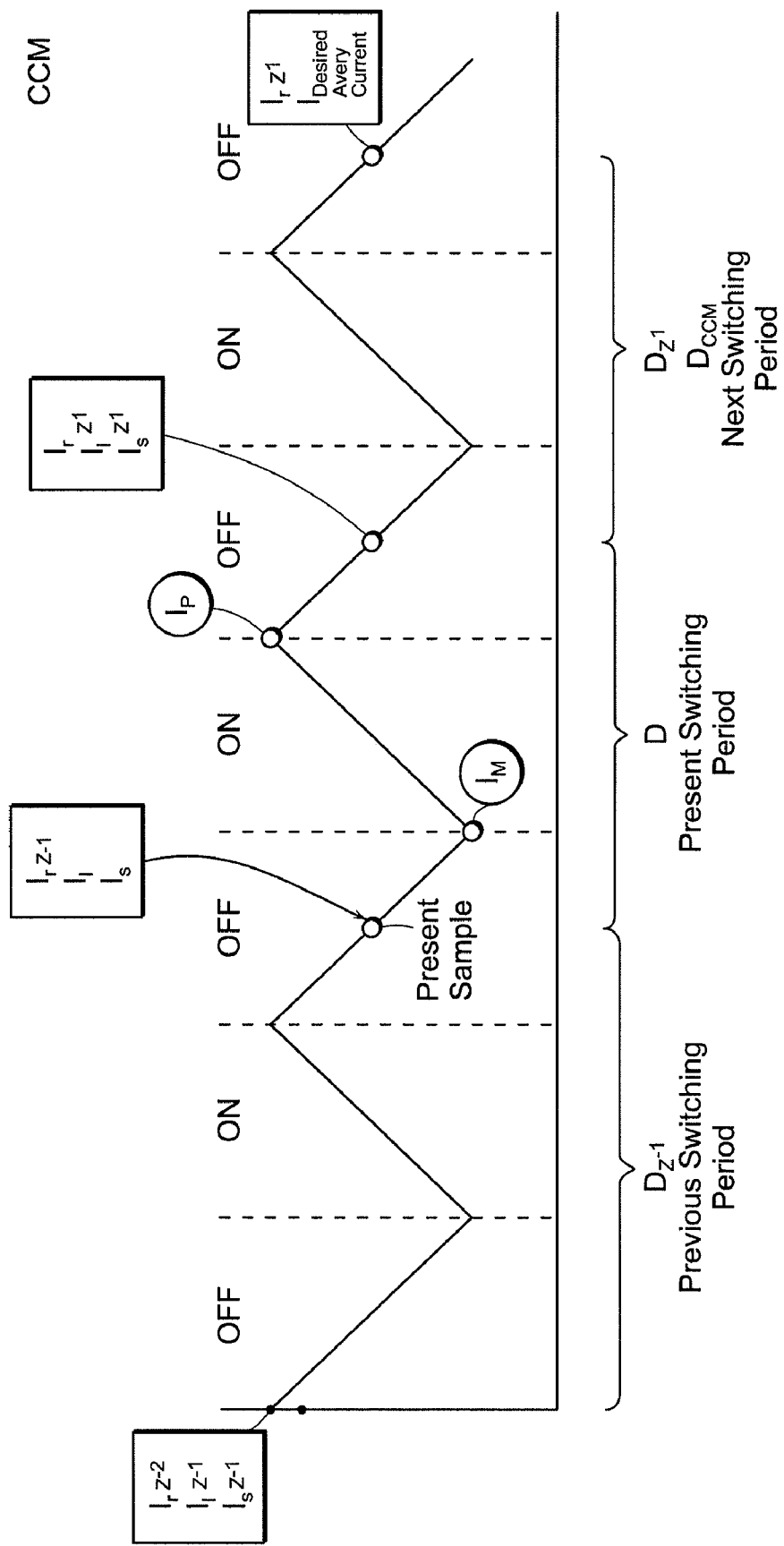
FIG. 5B is a signal diagram representing inductive current in the Boost Pre-regulator in steady state Continuous Current Mode (CCM).

FIG. 5B is a signal diagram representing inductive current in the Boost Pre-regulator in steady state Continuous Current Mode (CCM). A single switching period begins with a current sample $I_s$ and ends with a current sample $I_s * z^1$. The samples are taken at the midpoint of the OFF time for switch Q1. The current at the beginning of the present switching period at the point of sampling is:

$$I_{left} = I_l = I_{sample} = I_s \quad (2.1)$$

The current at the end of the present switching period is the same as the current at the beginning of the next switching period:

$$I_{right} = I_r = I_{left} * z^1 = I_l * z^1 = I_{sample} * z^1 = I_s * z^1 \quad (2.2)$$

The current at the beginning of the present switching period is also the same as the current at the end of the preceding switching period:

$$I_{right} * z^{-1} = I_r * z^{-1} = I_{left} = I_l = I_{sample} = I_s \quad (2.3)$$

The current at the beginning of the preceding switching period is:

$$I_{left} * z^{-1} = I_l * z^{-1} = I_{sample} * z^{-1} = I_s * z^{-1} \quad (2.4)$$

Assuming that $V_{in}$ and $V_{out}$ change negligibly during one switching period, the voltage applied across the inductor L1 during the OFF time is:

$$V_{Toff} = V_{in} - V_{out} \quad (2.5)$$

The voltage applied across the Inductor during the ON time is, (assuming that $V_{in}$ changes negligibly during one switching period):

$$V_{Ton} = V_{in} \quad (2.6)$$

Since the inductive current is sampled in the middle of the OFF time, the current declines for a period equal to one half the OFF time at which point the ON time begins. The minimum current is modeled as:

$$I_m = I_s + \frac{(1-D)}{2} * T * \frac{V_{Toff}}{L} \quad (2.7)$$

The current at the end of the ON time is the maximum current during the switching period is modeled as:

$$I_p = I_m + D*T*\frac{V_{Ton}}{L} \tag{2.8}$$

At the end of the ON time, the switch again turns off for a period equal to one half the ON time, and the current at the end of switching period modeled as follows:

$$I_r = I_p + \frac{(1-D)}{2}*T*\frac{V_{Toff}}{L} \tag{2.9}$$

$$I_r = I_s + (V_{Toff}*(1-D) + V_{Ton}*D)*\left(\frac{T}{L}\right) \tag{2.10}$$

$$I_r = I_s + (V_{in} - V_{out}*(1-D))*\left(\frac{T}{L}\right) \tag{2.11}$$

$$I_r = I_l + (V_{in} - V_{out}*(1-D))*\left(\frac{T}{L}\right) \tag{2.12}$$

$$I_r = I_r*z^{-1} + (V_{in} - V_{out}*(1-D))*\left(\frac{T}{L}\right) \tag{2.13}$$

Assuming that the input voltage $V_{in}$ and the output voltage $V_{out}$ change negligibly during the previous, present and next switching periods, the current at the end of the preceding switching period is modeled as follows:

$$I_r*z^{-1} = I_l = I_s*z^{-1} + (V_{in} - V_{out}*(1-D*z^{-1}))*\left(\frac{T}{L}\right) \tag{2.14}$$

$$I_r*z^{-1} = I_l = I_l*z^{-1} + (V_{in} - V_{out}*(1-D*z^{-1}))*\left(\frac{T}{L}\right) \tag{2.15}$$

$$I_r*z^{-1} = I_l = I_r*z^{-2} + (V_{in} - V_{out}*(1-D*z^{-1}))*\left(\frac{T}{L}\right) \tag{2.16}$$

The current at the end of the next switching period is:

$$I_r*z^1 = I_s*z^1 + (V_{in} - V_{out}*(1-D*z^1))*\left(\frac{T}{L}\right) \tag{2.17}$$

$$I_r*z^1 = I_l*z^1 + (V_{in} - V_{out}*(1-D*z^1))*\left(\frac{T}{L}\right) \tag{2.18}$$

$$I_r*z^1 = I_r + (V_{in} - V_{out}*(1-D*z^1))*\left(\frac{T}{L}\right) \tag{2.19}$$

In a boost inductor operating steady state CCM, the average current is equal to the midpoint of the upslope of inductor current, which is also equal to the midpoint of the down slope of inductor current. Since the inductor current is being sampled at the midpoint of the down slope, the control strategy is to calculate a value for the duty cycle for the next switching period $D*z^1$ that drives the current at the end of the next switching period to the desired average current value as follows:

$$I_{Desired\ Average\ Current} = I_r*z^1 \tag{2.20}$$

Substituting yields the following nonlinear model:

$$I_{Desired\ AverageCurrent} = \tag{2.21}$$
$$\left(I_s + (V_{in} - V_{out}*(1-D))*\left(\frac{T}{L}\right)\right) + (V_{in} - V_{out}*(1-D*z^1))*\left(\frac{T}{L}\right)$$

$$I_{Desired\ AverageCurrent} = \tag{2.22}$$
$$I_s + (2*(V_{in} - V_{out}) + V_{out}*(D+D*z^1))*\left(\frac{T}{L}\right)$$

Solving for $D*z^1$ yields:

$$D*z^1 = \tag{2.23}$$
$$(I_{Desired\ AverageCurrent} - I_s)*\left(\frac{1}{V_{out}}\right)*\left(\frac{L}{T}\right) + 2*\left(1 - \frac{V_{in}}{V_{out}}\right) - D$$

Recognizing the steady state duty cycle for a Boost converter operating in CCM is:

$$D_{Steady\ State} = 1 - \frac{V_{in}}{V_{out}} \tag{2.24}$$

where $D_{SteadyState}$ is constrained to $0 \leq D_{SteadyState} \leq 1$ yields:

$$D*z^1 = \tag{2.25}$$
$$(I_{Desired\ AverageCurrent} - I_s)*\left(\frac{1}{V_{out}}\right)*\left(\frac{L}{T}\right) + 2*D_{Steady\ State} - D$$

$$D*z^1 = (I_{Desired\ AverageCurrent} - I_s)*\left(\frac{1}{V_{out}}\right)*\left(\frac{L}{T}\right) + \tag{2.26}$$
$$D_{Steady\ State} + (D_{Steady\ State} - D)$$

Thus, the nonlinear model for the duty cycle of a boost converter in steady state CCM can be obtained from Equation (2.27) for a desired average current $I_{DesiredAverageCurrent}$ as follows:

$$D_{CCM} = \tag{2.27}$$
$$(I_{Desired\ AverageCurrent} - I_s)*\left(\frac{1}{V_{out}}\right)*\left(\frac{L}{T}\right) + 2*D_{Steady\ State} - D$$

The value for $D_{CCM}$ is preferably limited to a value less than 1.0. For example, in particular implementations it can be limited to 0.92 due to switching requirements.

In this particular embodiment, the resulting duty cycle is associated with pipeline delay of one switching period T. As a result of this pipeline delay, the control strategy takes two sample times to achieve the commanded target, which is akin to a 2 step Dahlin or Deadbeat control strategy. As a deadbeat algorithm, optimal performance can be obtained subject only to errors in measured values or assumed modeling values. Since this particular implementation only recurses on the last commanded output and uses only the present sampled values there are no issues akin to "integral windup. If the PWM pipeline delay can be eliminated, the commanded target can be achieved in one switching period.

Modeling Duty Cycle in Discontinuous Current Mode (DCM)

Figure 5C:
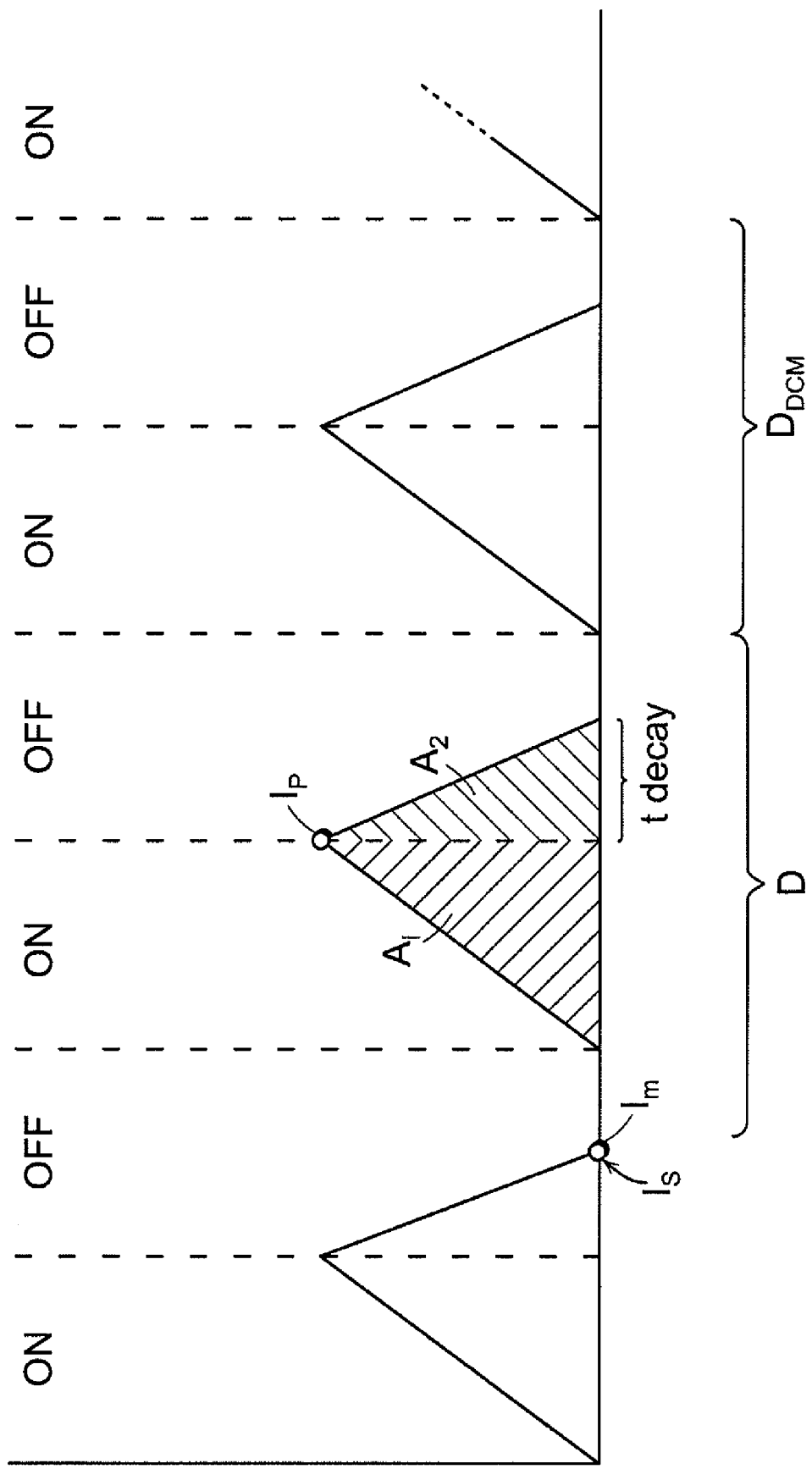
FIG. 5C is a signal diagram representing inductive current in the Boost Pre-regulator in steady state Discontinuous Current Mode (DCM).

FIG. 5C is a signal diagram representing inductive current in the Boost Pre-regulator in steady state Discontinuous Current Mode (DCM). According to a particular embodiment, solving and modeling the duty cycle in steady state DCM is similar to solving for the duty cycle in steady state CCM equation. For steady state CCM, given our choice of sample point, the average current is equal to the sampled current. This does not hold for the steady state DCM situation. Rather, the control strategy is to drive the average current to a desired value under steady state DCM conditions. Specifically, a model for average current in the steady state DCM is generated and then solved for the duty cycle. Equations (2.1) through (2.4) and (2.6) above still hold for steady state DCM. The rest of the equations change for DCM operation.

Referring to FIG. 5C, the inductive current $I_s$ is sampled in the middle of the OFF time while the current declines for a period equal to the decay time that is less than the OFF time. The Boost diode D1 does not allow the current to flow in the reverse direction and consequently the current can not be negative. Thus, the current at the start of the ON time is zero in steady state DCM and the low point for current $I_m$ occurs between the end of one ON time and the beginning of another.

The assumption that the boost converter is in steady state DCM greatly simplifies the solution since the average current can be computed from the area under the current waveform. Thus, computing the average current can be accomplished by computing the peak current value $I_p$ at the end of the ON time for the present switching period, computing area $A_1$ that corresponds to the average current during the ON time up to the peak current value, computing the time for the current to decay from the peak current value $I_p$ back to zero, and computing area $A_2$ that corresponds to the average current during the decay time. Both areas can be calculated simultaneously as one triangle, reducing the number of calculation steps.

It is noted that this particular embodiment for modeling the average current can be used even when there is current present at the beginning of the switching period in the steady state DCM. The reason for this is that in steady state DCM the inductive current must reach zero before the ON time begins and the duty cycle is the same in the previous and the following periods. Based on these assumptions, the area in the first OFF time can be aggregated together with the area in the second OFF time. Since the desired duty cycle is assumed to be the same or nearly the same in the preceding, present and next switching periods, the area at the beginning and the end combine into one single triangle with a base equal to the decay time. In steady state DCM, the decay time can not exceed the OFF time.

During the present switching period, the current at the end of the ON time is the maximum current $I_p$, while the minimum inductive current $I_m$ is zero in steady state DCM:

$$I_p = D * T * \frac{V_{Ton}}{L} \tag{3.1}$$

The time it takes for the current to decay back to zero, normalized to the switching period, is:

$$\frac{t_{decay}}{T} = \left(\frac{I_p}{V_{in} - V_{out}}\right) * \left(\frac{L}{T}\right) \tag{3.2}$$

The normalized area, or the average value, of current for the combination of the ON time and the decay time is:

$$I_{Desired\ AverageCurrent} = \left(\frac{1}{2}\right) * \left(D + \frac{t_{decay}}{T}\right) * I_p \tag{3.3}$$

After substituting and simplifying:

$$I_{Desired\ AverageCurrent} = \left(\frac{1}{2}\right) * D^2 * \left(\frac{V_{out} * V_{in}}{V_{out} - V_{in}}\right) * \left(\frac{T}{L}\right) \tag{3.4}$$

Solving for D:

$$D_{DCM} = \sqrt{2 * I_{Desired\ AverageCurrent} * \left(\frac{1}{V_{in}} - \frac{1}{V_{out}}\right) * \left(\frac{L}{T}\right)} \tag{3.5}$$

In this implementation, the model for the duty cycle in DCM assumes that $1/V_{in}$ is greater than $1/V_{out}$, else the result is forced to zero, rather than being undefined or imaginary. The value for $D_{DCM}$ is preferably limited to a value less than 1.0. For example, in particular implementations it can be limited to 0.92 due to switching requirements. In this implementation the sampled current $I_s$ is not used in the DCM model for duty cycle. Rather, the current regulator runs "open loop" in DCM. This is not true for all implementations nor is it required. Rather, whether or not the current regulator operates in open loop depends on the choice of sampling point and model.

One skilled in the art can readily appreciate that the above described control strategy is a particular implementation of a linear, inductance based control method for regulating average current of a boost converter in Discontinuous Current Mode (DCM) Other implementations are possible.

Selection of CCM or DCM Model

FIG. 6A-6D are signal diagrams of circuit mode transitions for illustrating a particular method for selection of the appropriate model. At the beginning of a switching period, the inductive current can be in one of two states, either the current is decaying towards zero or the current is zero. The first case occurs when the SMPS is transitioning from CCM into CCM or DCM, and the second case occurs when we are transitioning from DCM into DCM or CCM. Specifically, FIG. 6A illustrates a first case in which the current is in steady state DCM for the previous and present switching periods. In both periods, the current is zero at the end of the corresponding OFF times. FIG. 6B illustrates a second case in which the current is in DCM for the previous switching period and CCM for present switching period. The current is zero at the end of the first OFF time and non-zero at the end of the second OFF time. FIG. 6C illustrates a third case in which the current is in CCM for the previous switching period and DCM for the present switching period. The current is non-zero at the end of the first OFF time and zero at the end of the second OFF time. FIG. 6D illustrates a fourth case in which the current is in steady state CCM for the previous and present switching periods. In both periods, the current is non-zero at the end of the corresponding OFF times.

In this particular embodiment, a simplifying assumption is made that the period following Case 1 or Case 2 will be a DCM period and the value for duty cycle D for that switching period is computed using the DCM model. Similarly, for Case 3 or Case 4, the assumption is that the following switching period will be a CCM switching period, and the value for duty cycle D for that switching period is computed using the CCM model. Using these assumptions, the number of solutions to compute and choose between is reduced.

Thus, to determine whether to use the model for calculating the duty cycle in CCM mode ($D_{CCM}$) or the model for calculating the duty cycle in DCM mode ($D_{DCM}$), the CCM model for the duty cycle $D_{CCM}$ is used to calculate the minimum current during the switching period. Specifically, the value for the current at the end of the first Off time is calculated under the assumption that diode is not present and allowing the current to reverse. The diode in a conventional boost topology, such as that in FIG. 5, does not permit reverse current flow. If the calculated minimum is negative, the boost converter is deemed to be entering into DCM mode, and as a result, the steady state DCM model for duty cycle is selected. Conversely, if the calculated minimum is positive, the boost converter is deemed to be entering into CCM mode, and the steady state CCM model for duty cycle is selected. The calculated minimum current, assuming the use of the $D_{CCM}$ solution is:

$$I_{Minimum} = I_{Out} + \left(\frac{1}{2}\right) * (1 - D_{Last}) * \left(\frac{T}{L}\right) * (V_{In} - V_{Out}) \quad (4.0)$$

Even though the steady state models for steady state CCM and DCM modes do not provide an optimal solution during the transition states (CCM->DCM and DCM->CCM), the solution is always stable. In particular, both models calculate a value for the duty cycle which is a bit under the optimal value for the transition states, leading to a stable, slightly slower response when crossing the boundary. However, such implementation is an order of magnitude simpler, and in practice it is typical that these transitions occur only for a single switching period.

Figure 7:
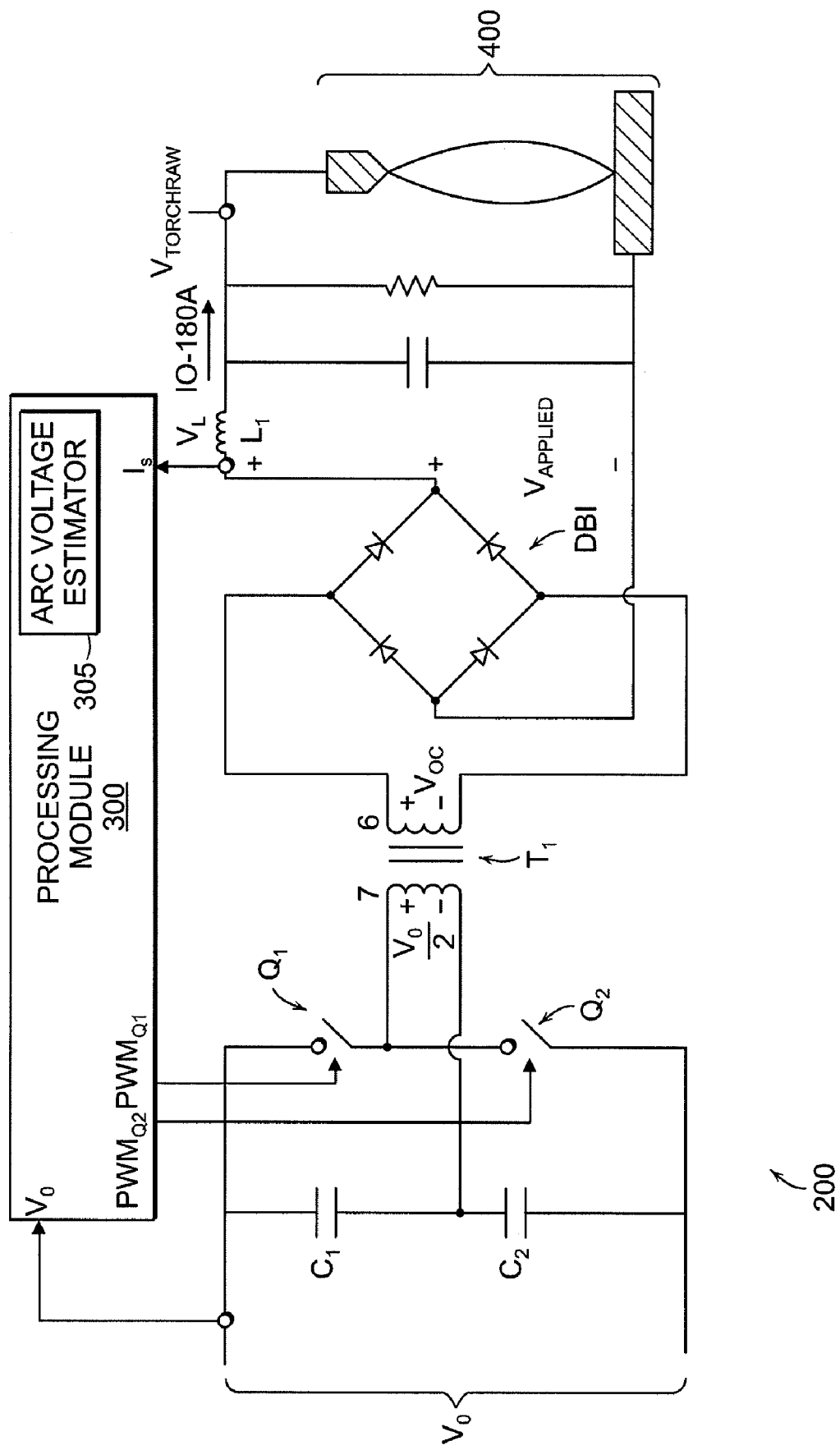
FIG. 7 is a schematic diagram the Half Bridge Buck-Derived Inverter of a plasma torch power supply for illustrating a particular embodiment of the linear, inductance based control method.

Linear Inductance Based Control for Regulating Average Current in a Buck-Derived, Half Bridge Inverter FIG. 7 is a schematic diagram the Half Bridge Buck-Derived Inverter of a plasma torch power supply for illustrating a particular embodiment of the linear, inductance based control method. In this particular embodiment, the inverter stage 200 is designed to implement an isolated linear, inductance based current source (LIBCS) for operation in Continuous Current Mode (CCM) with an output range between 10-180 Amperes. Other embodiments can be implemented in which the inverter operates in both CCM and DCM.

As shown, the inverter stage 200 is powered by an input voltage $V_o$ provided from the Boost pre-regulator. The half bridge, which operates at 30 KHz, includes upper and lower legs Q1, Q2 (e.g., IGBT switches) operating separately at 15 KHz. The upper and lower legs of the half bridge are driven by two of the PWM outputs ($PWM_{Q1}$, $PWM_{Q2}$) from the digital control module 300. In this particular embodiment, the PWM (not shown) is programmed for "centered" operation and alternates between driving one IGBT and the other. Other operation modes of the PWM operation and other timing schemes for the sampling circuitry can also be implemented. The half bridge, in turn, drives a transformer T1 with a 7:6 primary to secondary turns ratio. The output of the transformer secondary is further coupled to a diode bridge DB1 which provides full wave rectification for driving an inductor L1 with a minimal output capacitance C3

Preferably, both the upper leg Q1 and lower leg Q2 of the inverter are deliberately programmed to have identical pulse widths under all conditions. This is done to preclude saturation of the output transformer T1. In particular, by programming the legs Q1, Q2 with identical pulse widths, coupled with the behavior of the split capacitor legs C1, C2 of the half bridge, the need for elaborate anti-saturation logic in the control loop implementation or the need to limit turn on or turn off of the inverter is eliminated.

During operation, the digital control module 300 samples various points of the circuit at a rate of 15 KHz. For example, the processing module 300 samples and measures the input voltage $V_o$ (which is the same as the output voltage of the preceding Boost stage) and the current $I_s$ flowing in the buck inductor L1. In this particular embodiment, the current is sampled at the midpoint of the ON time of lower leg Q2. The output voltage $V_{torch}$ is can also be measured, but in this particular embodiment, the output voltage $V_{torch}$ is estimated using an arc voltage estimation module 305. Based on this information, the digital control module 300 can determine an appropriate duty cycle to achieve a commanded current during the next switching period. Since in steady state for a Buck converter, the average inductive current is equal to the sampled current at the midpoint of the upslope (and the downslope) of current, the control strategy is to drive sampled current to equal the desired average current value.

$$I_{Sample\ (in\ Steady\ State)} = I_{Average\ (in\ Steady\ State)}$$

Table 2 identifies a number of parameters discussed in this particular embodiment of the linear, inductance based control method for controlling the average current in the Buck Derived, Half Bridge Inverter of FIG. 7. One skilled in the art can readily appreciate that other embodiments are possible.

TABLE 2

| | |
|---|---|
| $I_{sample}$ or $I_s$ | Present current sample |
| $I_{left}$ or $I_l$ | Current at the beginning of the switching period. |
| $I_{right}$ or $I_r$ | Current at the end of the switching period. |
| $z^{-1}$ | Time delay operator. |
| Is * $z^0$ or $I_s$ | Present current sample |
| Is * $z^1$ | Current sample delayed one switching period. |
| Is * $z^{-1}$ | Current sample preceding the present current sample |
| D | Duty cycle of the present switching period |
| L | Inductance in Henries. |
| T | Switching period in seconds. |
| $V_{out}$ or $V_o$ | Output Voltage of the Boost pre-regulator and the input to Half bridge, Buck derived inverter. |
| $V_{OC}$ or $V_{oc}$ | Open circuit voltage on the secondary of the transformer. |
| $V_{applied}$ | Average voltage applied the secondary circuit before the inductor and load. |
| $V_L$ or $V_l$ | Average voltage across the Buck inductor. |
| $V_{torch\_raw}$ | Raw, noisy estimate of the torch voltage |
| $V_{torch}$ | Filtered estimate of the torch voltage. |
| $b_l$ | Feedback coefficient for the unity gain digital low pass filter used to filter the torch voltage estimate. |
| $N_p$ | Number of turns in the primary of the transformer. |
| $N_s$ | Number of turns in the secondary of the transformer. |

A single switching period begins with a current sample $I_s$ and ends with a current sample $I_s * z^1$. The samples are taken at the midpoint of the OFF time for switch Q2. In addition the previous measured value of current and the previous duty cycle are also included due to a one sample pipeline delay in the PWM. The following equations are provided for a 15 KHz sampling period, and the output treated as a 2 beat Buck converter, since both the upper and lower duty cycles are the same.

The open circuit voltage $V_{oc}$ on the secondary is a function of the voltage available at the half bridge and the transformer turns ratio. Since this is a half bridge, only half the applied voltage $V_o$ is provided to the transformer T1. The voltage at the secondary is reduced according to the turns ratio Ns to Np. ($V_o$ is the voltage at the output of the Boost pre-regulator and is the input voltage to the half bridge):

$$V_{oc} = V_o * \left(\frac{1}{2}\right) * \left(\frac{N_s}{N_p}\right) \quad (5.1)$$

The average voltage applied to the output circuit (i.e., the inductor and the load) is:

$$V_{applied} = D * V_{oc} \quad (5.2)$$

The basic equation for the voltage across an inductor is:

$$v = L \frac{di}{dt} \quad (5.3)$$

Converting to a discrete form we obtain:

$$V_L = L * \left(\frac{I_s - I_s * z^{-1}}{T}\right) = I_s * (1 - z^{-1}) * \left(\frac{L}{T}\right) \quad (5.4)$$

The output voltage $V_{torchraw}$ can be estimated as the difference between the average applied voltage and the voltage drop across the inductor.

$$V_{torch\,raw} = V_{applied} - V_L \quad (5.5)$$

The raw voltage estimate is too noisy to use directly and can be filtered by the following unity gain digital Low Pass filter:

$$\frac{Y}{X} = \frac{(1-b_1)}{1 - b_1 * z^{-1}} \quad (5.6)$$

Rearranging:

$$Y = Y * z^{-1} + (X - Y * z^{-1}) * (1 - b_1) \quad (5.7)$$

$$V_{torch} = V_{torch} * z^{-1} + (V_{torch\,raw} - V_{torch} * z^{-1}) * (1 - b_1) \quad (5.8)$$

The raw and filtered estimates of the output voltage, $V_{torchraw}$ and $V_{torch}$ respectively, can be estimated and filtered using any technique known to those skilled in the art. For example, a system and method for estimating output voltage is disclosed in co-pending U.S. patent application Ser. No. 11/602,047, entitled "ARC VOLTAGE ESTIMATION AND USE OF ARC VOLTAGE ESTIMATION IN THERMAL PROCESSING SYSTEMS," filed concurrently herewith. The entire teachings of the above application are incorporated herein by reference. Alternatively, the output voltage can be directly measured using any technique known to those skilled in the art.

Now we solve for the average current in steady state CCM, which is then back solved for the duty cycle to achieve the desired average current. When sampling current in steady state CCM at the midpoint of the up slope, the average current in steady state for the first half of the switching period is equal to the sampled current. Furthermore, since the duty cycle for the first half of the switching period (lower leg) and the second half of the switching period (upper leg) are the same in this implementation, the average current in the second half of the switching period is the same as in the first half. Thus, the average current in the half bridge, buck derived inverter in steady state CCM can be modeled as follows:

First, the instantaneous voltage across the inductor is determined when the switch is on:

$$V_{on} = V_L = V_{oc} - V_{torch} \quad (5.9)$$

Then, the instantaneous voltage across the inductor is determined when the switch is off:

$$V_{on} = -V_{torch} \quad (5.10)$$

The current at the beginning of the present switching period at the sample point is:

$$I_{left} = I_l = I_{sample} = I_s \quad (5.11)$$

Given a current sample at the beginning of the switching period, which is located at the midpoint of the lower leg's ON time, and assuming that both legs switch in during one period and that the duty cycle is the same for both, the current at the end of the switching period is modeled by Equation 5.12 and 5.13:

$$I_r = I_l + \left(\frac{1}{2}\right) * \left(\frac{1}{2}\right) * D * V_{on} * \left(\frac{T}{L}\right) + \quad (5.12)$$
$$\left(\frac{1}{2}\right) * (1-D) * V_{off} * \left(\frac{T}{L}\right) + \left(\frac{1}{2}\right) * D * V_{on} * \left(\frac{T}{L}\right) +$$
$$\left(\frac{1}{2}\right) * (1-D) * V_{off} * \left(\frac{T}{L}\right) + \left(\frac{1}{2}\right) * \left(\frac{1}{2}\right) * D * V_{on} * \left(\frac{T}{L}\right)$$

$$I_r = I_l + (D * V_{on} + (1-D) * V_{off}) * \left(\frac{T}{L}\right) \quad (5.13)$$

In this particular embodiment, the control strategy is to drive the sampled current $I_{right}$ to a value equal to the desired average current. Redefining $I_r$ as $I_{desired}$ and solve for D is given as Equation 5.14:

$$I_{desired} = I_l + (D * V_{on} + (1-D) * V_{off}) * \left(\frac{T}{L}\right) \quad (5.14)$$

Solving for D:

$$D = \frac{(I_{desired} - I_l) * \left(\frac{L}{T}\right) - V_{off}}{V_{on} - V_{off}} \quad (5.15)$$

and substituting for $V_{on}$ and $V_{off}$:

$$D = \frac{(I_{desired} - I_l) * \left(\frac{L}{T}\right) - (-V_{torch})}{(V_{oc} - V_{torch}) - (-V_{torch})} \quad (5.16)$$

$$D = \frac{(I_{desired} - I_l) * \left(\frac{L}{T}\right) + V_{torch}}{V_{oc}} \quad (5.17)$$

$$D = \left((I_{desired} - I_s) * \left(\frac{L}{T}\right) + V_{torch}\right) * \left(\frac{1}{V_{oc}}\right) \quad (5.18)$$

In this particular embodiment, a one sample delay is introduced by the hardware into the calculations of the duty cycle. Thus, implicit in this particular embodiment is that it takes at least two sampling periods to achieve the commanded target, which is akin to a 2 step Dahlin or Deadbeat control strategy. However, other embodiments of the control method do not require the one sample delay. Classic control theory cannot deal with pure time delays other than by approximating them, destabilizing the control loop solutions. With the exception of necessary isolation circuitry, this methodology can provide a single chip solution.

Cross Regulation Between a Pre-regulator and a Post-regulator

According to another aspect, a method and apparatus is featured for providing cross-regulation between pre-regulator and post-regulator power stages of a switch mode power supply. Referring back to FIG. 3, a PFC Boost Pre-regulator is shown coupled to an Inverter Post-regulator. The current drawn by this switch mode power supply can range from less than 0.25 Amps when idling up to more than 200 Amps in a particular plasma cutting application. Such wide and dynamic current ranges can cause the output voltage of the boost pre-regulator to experience large overshoots and undershoots whenever the inverter is turned on, turned off, or whenever the plasma arc is extinguished. These so-called "droops" at the output of the boost pre-regulator 100 can compromise the transient performance of the inverter post-regulator 200, leading to over-current events as the inverter tries to compensate for the voltage droop. Thus, the pre-regulator 100 and the post-regulator 200 can end up conflicting with each other leading to problems such as over/under voltage, shutdown, instability, oscillation, output droop, over current, sub-harmonic oscillation, bifurcation, chaotic "oscillation" and the like.

Using a linear, inductance based control approach to the design of the boost pre-regulator 100 enables current feedback from the output of the inverter post regulator 200 to be used as a feed forward term to the pre-regulator. Using the feed forward term, the boost pre-regulator can precisely compensate for the effects of changes in the inverter output. Due to the linearity of the linear, inductance based control approach, such cross regulation can be accomplished regardless of input line voltage, load fluctuations in current or voltage, or operation in DCM, CCM and transitions therebetween. For example, according to a particular embodiment, such cross regulation can enable stable operation in the event of full load steps from 0-180 Amperes and conversely, from 180-0 Amperes, with minimal fluctuations in the output of the pre-regulator. For a 750 VDC bus, output fluctuations at the boost pre-regulator can be less than 5 Volts or less than 1%.

Figure 8A:
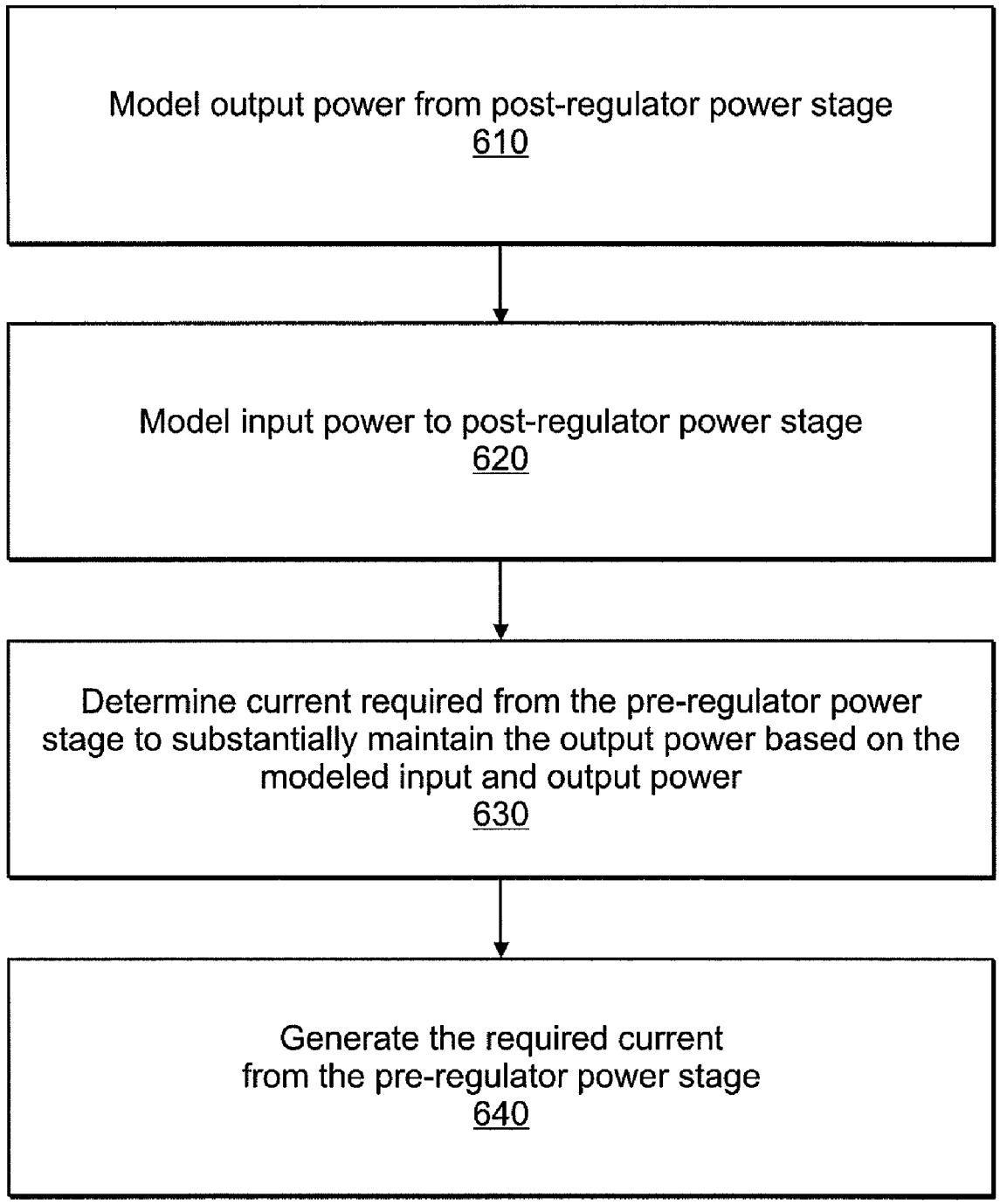
FIG. 8A is a flow diagram illustrating a method of cross regulation between a pre-regulator and a post-regulator using a linear, inductance based control method.

FIG. 8A is a flow diagram illustrating a method of cross regulation between a pre-regulator and a post-regulator using a linear, inductance based control method. By feeding back the output current from a subsequent power stage, the design of a Boost stage (with or without PFC) in a SMPS can be simplified and more economical, particularly when the SMPS must support a wide range of full load to light load current demands (e.g., greater than 10:1). Without such a mechanism, the aforementioned problems can occur.

According to a particular embodiment, the principle is based on a "power in equals power out" concept. Although not so limited, the following example describes cross-regulation for a Boost stage followed by a transformer isolated Half Bridge Inverter. Other embodiments for implementing cross regulation between a pre-regulator and a post-regulator using a linear, inductance based control method. For example, cross regulation can be implemented for topologies including a Boost converter coupled to a Buck converter, a Buck converter coupled to a Full Bridge, and the like, for example.

At step 610, the output power from the post-regulator is determined. For example, the output power can be solved in terms of available measurements, estimates and parameters. In one particular embodiment, the output power is obtained in terms of the output voltage as a function of input bus voltage (identical to Boost Output Voltage), Duty Cycle, Transformer Turns Ratio and Half Bridge DC gain (½) as shown in Equation (6.1). Specifically, the actual output current $I_{out}$ from the inverter is fed back to the pre-regulator and scaled appropriately in light of the transformer turns ratio.

$$P_{Out} = V_{Out} * I_{Out} = D * V_{Bus} * \left(\frac{1}{2}\right) * \left(\frac{N_S}{N_P}\right) * I_{Out} \tag{6.1}$$

At step 620, the input power to the post-regulator is determined. For example, the input power can be determined in terms of available measurements, estimates and parameters.

$$P_{In} = V_{In} * I_{In} \tag{6.2}$$

At step 630, the current required from the pre-regulator to maintain the output power can be determined by equating the equations for power in (6.2) and power out (6.1) and solved for $I_{In}$ as follows:

$$I_{In} = D * V_{Bus} * \left(\frac{1}{2}\right) * \left(\frac{N_S}{N_P}\right) * \left(\frac{1}{V_{In}}\right) * I_{Out} \tag{6.3}$$

Figure 8B:
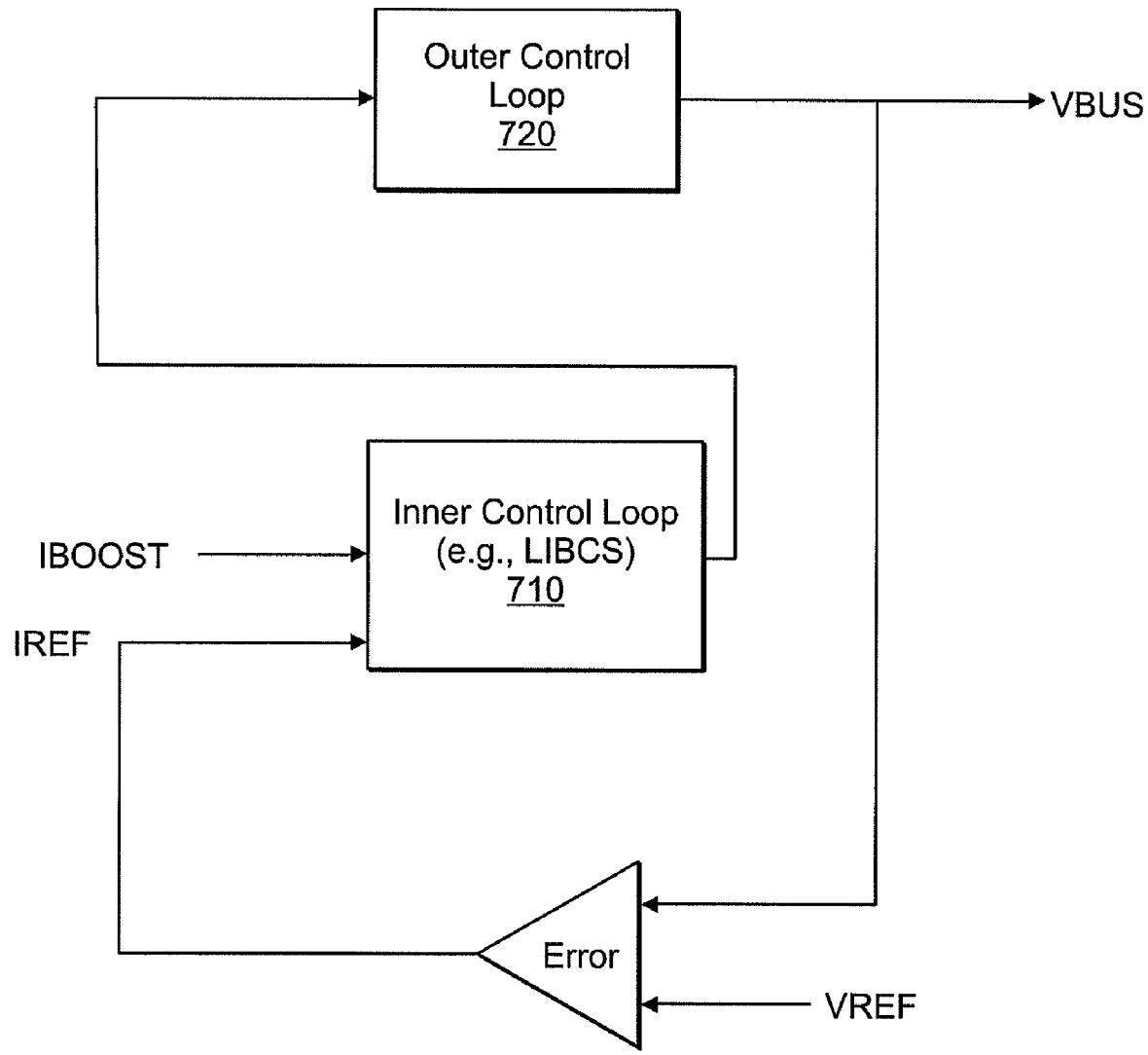
FIG. 8B is a flow diagram illustrating inner and outer control loops for regulating current and voltage of a Boost stage.

At step 640, the required current $I_{In}$ is summed with the output of the outer voltage control loop in the Boost stage and used to feed the input to the inner current loop in the Boost stage. FIG. 8B is a flow diagram illustrating inner and outer control loops 710, 720 for regulating current and voltage of a Boost stage. Assuming that the inner control loop 710 implements an embodiment of the linear, inductance based control method, current regulation operates independently of input voltage. Conversely, if the inner control loop 710 implements a prior art solution for current control, additional term(s) would be needed to account for the input line voltage, duty cycle and load terms.

In addition, several optional features can be included. For example, the output power estimate or the desired current can be smoothed by filtering; the power current or other parameter can be limited to a desired magnitude; and the desired current can be corrected for static or dynamic efficiency of the power stage. Correction of the current for dynamic efficiency can be accomplished by dividing the current by the ratio of the output power by the input power.

While this invention has been particularly shown and described with references to preferred embodiments thereof, it will be understood by those skilled in the art that various changes in form and details may be made therein without departing from the scope of the invention encompassed by the appended claims.

What is claimed:

1. A method for providing linear control of a regulated electrical property in a switch mode power supply of a thermal processing system including an inductive element and at least one switching element, the method comprising a computing device performing the steps of:

generating a first nonlinear model for predicting values for a regulated electrical property of the inductive element in the switch mode power supply of the thermal processing system based on a given duty cycle of the at least one switching element; and generating a second nonlinear model for determining a duty cycle for the at least one switching element based on the first nonlinear model for the regulated electrical property, the second nonlinear model determining the duty cycle such that a linear relationship results between the regulated electrical property and a selected value regardless of variations in electrical inputs and outputs of the switch mode power supply.

2. The method of claim 1 further comprising:
determining the duty cycle to achieve the selected value for the regulated electrical property from the second nonlinear model for determining the duty cycle.

3. The method of claim 1 wherein the regulated electrical property of the inductive element is current or voltage.

4. The method of claim 1 wherein the switch mode power supply includes a boost converter, a buck converter, a buck-boost converter, a boost-buck converter, a Cuk converter, a Zeta converter, or a SEPIC converter.

5. A method for providing linear control of a regulated electrical property in a switch mode power supply of a thermal processing system including an inductive element and at least one switching element, the method comprising a computing device performing the steps of:
generating a first nonlinear model for predicting values for a regulated electrical property of the inductive element in the switch mode power supply of the thermal processing system based on a given duty cycle of the at least one switching element; and
generating a second nonlinear model for determining a duty cycle for the at least one switching element based on the first nonlinear model for the regulated electrical property, the second nonlinear model determining the duty cycle such that a linear relationship results between the regulated electrical property and a selected value;
wherein generating the first nonlinear model comprises:
generating a third nonlinear, predictive model for predicting discrete values of inductive current in a circuit mode based on present values of duty cycle, applied voltage and inductive current; and
generating a fourth nonlinear, predictive model for predicting average values of inductive current in the circuit mode based on the present and predicted values for inductive current;
wherein generating the second nonlinear model comprises:
generating a fifth nonlinear, predictive model for determining a duty cycle from the third nonlinear predictive model and the fourth nonlinear predictive model, the fifth nonlinear predictive model determining the duty cycle such that a linear relationship results between an average value for inductive current and a selected value in the circuit mode.

6. The method of claim 5 wherein the circuit mode is Continuous Current Mode (CCM) or Discontinuous Current Mode (DCM).

7. A method for providing linear control of a regulated electrical property in a switch mode power supply of a thermal processing system including an inductive element and at least one switching element, the method comprising a computing device performing the steps of:
generating a first nonlinear model for predicting values for a regulated electrical property of the inductive element in the switch mode power supply of the thermal processing system based on a given duty cycle of the at least one switching element;
generating a second nonlinear model for determining a duty cycle for the at least one switching element based on the first nonlinear model for the regulated electrical property, the second nonlinear model determining the duty cycle such that a linear relationship results between the regulated electrical property and a selected value;
wherein generating the first nonlinear model comprises:
generating, based on present values of duty cycle, applied voltage and inductive current, a plurality of third nonlinear models for predicting discrete values of inductive current in each circuit mode or transition between circuit modes; and
generating, based on the present and predicted values for inductive current, a plurality of fourth nonlinear models for predicting average values of inductive current in each circuit mode or transition between circuit modes;
wherein generating the second nonlinear model comprises:
generating, based on the plurality of third nonlinear models and the plurality of fourth nonlinear models, a plurality of fifth nonlinear, predictive models for determining a duty cycle such that a linear relationship results between an average value for inductive current and a selected value in each circuit mode or transition between circuit modes.

8. The method of claim 7 further comprising:
determining a circuit mode or transition being entered during a subsequent switching period;
selecting one of the plurality of fifth nonlinear predictive models for determining the duty cycle that corresponds to the determined circuit mode or transition; and
determining the duty cycle for the selected value from the selected model.

9. The method of claim 7 wherein the circuit mode includes Continuous Current Mode (CCM) or Discontinuous Current Mode (DCM).

10. The method of claim 7 wherein the transition between circuit modes includes CCM to DCM or DCM to CCM.

11. An apparatus for providing linear control of a regulated electrical property in a switch mode power supply of a thermal processing system including an inductive element and at least one switching element, the apparatus comprising:
means for generating a first nonlinear model for predicting values for a regulated electrical property of the inductive element in the switch mode power supply of the thermal processing system based on a given duty cycle of the at least one switching element; and
means for generating a second nonlinear model for determining a duty cycle for the at least one switching element based on the first nonlinear model for the regulated electrical property, the second nonlinear model determining the duty cycle such that a linear relationship results between the regulated electrical property and a selected value;
wherein the means for generating the first nonlinear model comprises:
means for generating a third nonlinear, predictive model for predicting discrete values of inductive current in a circuit mode based on present values of duty cycle, applied voltage and inductive current; and
means for generating a fourth nonlinear, predictive model for predicting average values of inductive current in the circuit mode based on the present and predicted values for inductive current;
wherein the means for generating the second nonlinear model comprises:
means for generating a fifth nonlinear, predictive model for determining a duty cycle from the third nonlinear predictive model and the fourth nonlinear predictive model, the fifth nonlinear predictive model determining the duty cycle such that a linear relationship results between an average value for inductive current and a selected value in the circuit mode.

12. An apparatus for providing linear control of a regulated electrical property in a switch mode power supply of a thermal processing system including an inductive element and at least one switching element, the apparatus comprising:

means for generating a first nonlinear model for predicting values for a regulated electrical property of the inductive element in the switch mode power supply of the thermal processing system based on a given duty cycle of the at least one switching element;

means for generating a second nonlinear model for determining a duty cycle for the at least one switching element based on the first nonlinear model for the regulated electrical property, the second nonlinear model determining the duty cycle such that a linear relationship results between the regulated electrical property and a selected value;

wherein the means for generating the first nonlinear model comprises:

means for generating, based on present values of duty cycle, applied voltage and inductive current, a plurality of third nonlinear models for predicting discrete values of inductive current in each circuit mode or transition between circuit modes; and means for generating, based on the present and predicted values for inductive current, a plurality of fourth nonlinear models for predicting average values of inductive current in each circuit mode or transition between circuit modes;

wherein the means for generating the second nonlinear model comprises:

means for generating, based on the plurality of third nonlinear models and the plurality of fourth nonlinear models, a plurality of fifth nonlinear, predictive models for determining a duty cycle such that a linear relationship results between an average value for inductive current and a selected value in each circuit mode or transition between circuit modes.

13. The apparatus of claim 12 further comprising:
means for determining a circuit mode or transition being entered during a subsequent switching period;
means for selecting one of the plurality of fifth nonlinear models for determining the duty cycle that corresponds to the determined circuit mode or transition; and
means for determining the duty cycle for the selected value from the selected model.

14. The apparatus of claim 12 wherein the circuit mode includes Continuous Current Mode (CCM) or Discontinuous Current Mode (DCM).

15. The apparatus of claim 12 wherein the transition between circuit modes includes CCM to DCM or DCM to CCM.

16. An apparatus for providing linear control of a regulated electrical property in a switch mode power supply of a thermal processing system including an inductive element and at least one switching element, the apparatus comprising:
means for generating a first nonlinear model for predicting values for a regulated electrical property of the inductive element in the switch mode power supply of the thermal processing system based on a given duty cycle of the at least one switching element; and
means for generating a second nonlinear model for determining a duty cycle for the at least one switching element based on the first nonlinear model for the regulated electrical property, the second nonlinear model determining the duty cycle such that a linear relationship results between the regulated electrical property and a selected value regardless of variations in electrical inputs and outputs of the switch mode power supply.

17. The apparatus of claim 16 further comprising means for determining the duty cycle to achieve the selected value for the regulated electrical property from the second nonlinear model for determining the duty cycle.

18. The apparatus of claim 16 wherein the regulated electrical property of the inductive element is current or voltage.

19. The apparatus of claim 16 wherein the switch mode power supply includes a boost converter, a buck converter, a buck-boost converter, a boost-buck converter, a Cuk converter, a Zeta converter, or a SEPIC converter.

20. An apparatus for providing linear control of a regulated electrical property in a switch mode power supply of a thermal processing system including an inductive element and at least one switching element, the apparatus comprising a processor programmed with instructions to:
generate a first nonlinear model for predicting values for a regulated electrical property of the inductive element in the switch mode power supply of the thermal processing system based on a given duty cycle of the at least one switching element; and
generate a second nonlinear model for determining a duty cycle for the at least one switching element based on the first nonlinear model for the regulated electrical property, the second nonlinear model determining the duty cycle such that a linear relationship results between the regulated electrical property and a selected value regardless of variations in electrical inputs and outputs of the switch mode power supply.

21. An apparatus for providing linear control of a regulated electrical property in a switch mode power supply of a thermal processing system including an inductive element and at least one switching element, the apparatus comprising a processor programmed with instructions to:
generate a first nonlinear model for predicting values for a regulated electrical property of the inductive element in the switch mode power supply of the thermal processing system based on a given duty cycle of the at least one switching element; and
generate a second nonlinear model for determining a duty cycle for the at least one switching element based on the first nonlinear model for the regulated electrical property, the second nonlinear model determining the duty cycle such that a linear relationship results between the regulated electrical property and a selected value;
wherein the instructions to generate the first nonlinear model comprise instructions to:
generate a third nonlinear, predictive model for predicting discrete values of inductive current in a circuit mode based on present values of duty cycle, applied voltage and inductive current; and
generate a fourth nonlinear, predictive model for predicting average values of inductive current in the circuit mode based on the present and predicted values for inductive current;
wherein the instructions to generate the second nonlinear model comprise instructions to:
generate a fifth nonlinear, predictive model for determining a duty cycle from the third nonlinear predictive model and the fourth nonlinear predictive model, the fifth nonlinear predictive model determining the duty cycle such that a linear relationship results between an average value for inductive current and a selected value in the circuit mode.

22. An apparatus for providing linear control of a regulated electrical property in a switch mode power supply of a thermal processing system including an inductive element and at least one switching element, the apparatus comprising a processor programmed with instructions to:

generate a first nonlinear model for predicting values for a regulated electrical property of the inductive element in the switch mode power supply of the thermal processing system based on a given duty cycle of the at least one switching element;

generate a second nonlinear model for determining a duty cycle for the at least one switching element based on the first nonlinear model for the regulated electrical property, the second nonlinear model determining the duty cycle such that a linear relationship results between the regulated electrical property and a selected value;

wherein the instructions to generate the first nonlinear model comprise instructions to:
  generate, based on present values of duty cycle, applied voltage and inductive current, a plurality of third nonlinear models for predicting discrete values of inductive current in each circuit mode or transition between circuit modes; and
  generate, based on the present and predicted values for inductive current, a plurality of fourth nonlinear models for predicting average values of inductive current in each circuit mode or transition between circuit modes;

wherein the instructions to generate the second nonlinear model comprise instructions to:
  generate, based on the plurality of third nonlinear models and the plurality of fourth nonlinear models, a plurality of fifth nonlinear, predictive models for determining a duty cycle such that a linear relationship results between an average value for inductive current and a selected value in each circuit mode or transition between circuit modes.

* * * * *